(12) United States Patent
Fuller et al.

(10) Patent No.: US 11,913,730 B2
(45) Date of Patent: Feb. 27, 2024

(54) HEAT EXCHANGER ARRANGEMENT AND METHOD FOR PRODUCING A HEAT EXCHANGER ARRANGEMENT

(71) Applicant: PFANNENBERG GMBH, Hamburg (DE)

(72) Inventors: Russell Fuller, Lancaster, NY (US); Peter Starp, Hamburg (DE)

(73) Assignee: PFANNENBERG GMBH, Hamburg (DE)

( * ) Notice: Subject to any disclaimer, the term of this patent is extended or adjusted under 35 U.S.C. 154(b) by 578 days.

(21) Appl. No.: 16/844,052

(22) Filed: Apr. 9, 2020

(65) Prior Publication Data

US 2020/0326140 A1 Oct. 15, 2020

(30) Foreign Application Priority Data

Apr. 9, 2019 (EP) ..................................... 19168012

(51) Int. Cl.
| | |
|---|---|
| *F28F 1/10* | (2006.01) |
| *B23P 15/26* | (2006.01) |
| *F28F 9/02* | (2006.01) |

(52) U.S. Cl.
CPC ................ *F28F 1/10* (2013.01); *B23P 15/26* (2013.01); *F28F 9/02* (2013.01)

(58) Field of Classification Search
CPC ... F28F 1/10; F28F 9/02; F28F 9/0278; B23P 15/26

(Continued)

(56) References Cited

U.S. PATENT DOCUMENTS

| | | | | |
|---|---|---|---|---|
| 5,186,246 | A | * | 2/1993 | Halstead ............... F28D 1/0435 165/173 |
| 5,309,725 | A | * | 5/1994 | Cayce ..................... F24F 12/00 62/90 |
| 5,806,583 | A | * | 9/1998 | Suzuki .................. H01L 23/467 165/104.34 |

(Continued)

FOREIGN PATENT DOCUMENTS

| | | |
|---|---|---|
| JP | S63-154967 | 10/1988 |
| WO | 2007069570 A1 | 6/2007 |
| WO | 2011134786 A1 | 11/2011 |

OTHER PUBLICATIONS

European Search Report dated Sep. 10, 2019 from the corresponding EP Patent Application No. 19168012.

*Primary Examiner* — Jianying C Atkisson
*Assistant Examiner* — Raheena R Malik
(74) *Attorney, Agent, or Firm* — Grogan, Tuccillo & Vanderleeden LLP

(57) ABSTRACT

A heat exchanger including a first heat absorbing section and a second heat releasing section, such that a plurality of heat exchange structures are arranged, preferably in parallel, in a plane of extension. The first heat absorbing section includes a first plurality of fluid guiding devices and the second heat releasing section comprises a second plurality of fluid guiding devices. Each heat exchange structure includes at least one fluid guiding devices of the first plurality and at least one fluid guiding devices of the second plurality thermally connected to each other, and preferably arranged in parallel. A clearance disposed between two adjacent heat exchange structures allows airflow between adjacent heat exchange structures and/or each heat exchange structure includes a heat sink to thermally couple the fluid guiding devices of the first plurality and the fluid guiding devices of the second plurality.

20 Claims, 15 Drawing Sheets

(58) Field of Classification Search
USPC .......................................................... 165/173
See application file for complete search history.

(56) References Cited

U.S. PATENT DOCUMENTS

| | | | |
|---|---|---|---|
| 5,884,696 A | 3/1999 | Loup | |
| 6,347,528 B1* | 2/2002 | Iritani | B60H 1/3207 62/434 |
| 10,766,340 B2* | 9/2020 | Lee | F25B 1/10 |
| 2001/0042614 A1* | 11/2001 | Okamoto | F28D 15/0266 165/104.34 |
| 2003/0178188 A1* | 9/2003 | Coleman | F28F 1/022 165/110 |
| 2004/0060316 A1 | 4/2004 | Ito et al. | |
| 2005/0279127 A1* | 12/2005 | Jia | F25B 1/10 62/507 |
| 2008/0041071 A1 | 2/2008 | Itoh | |
| 2010/0186934 A1 | 7/2010 | Bellenfant et al. | |
| 2010/0263847 A1* | 10/2010 | Alahyari | F28D 1/05333 165/173 |
| 2010/0277870 A1* | 11/2010 | Agostini | F28D 15/0266 165/173 |
| 2014/0174709 A1 | 6/2014 | Yoshioka et al. | |
| 2014/0262181 A1* | 9/2014 | Taras | F28D 1/05391 29/890.047 |
| 2014/0318170 A1 | 10/2014 | Katoh et al. | |
| 2015/0296665 A1* | 10/2015 | Cacho Alonso | H05K 7/206 165/104.27 |
| 2016/0054075 A1* | 2/2016 | Taras | F28F 9/02 165/173 |
| 2018/0338392 A1* | 11/2018 | Fuller | F28D 15/0275 |
| 2020/0191490 A1* | 6/2020 | Jin | F28F 9/0278 |
| 2020/0326140 A1* | 10/2020 | Fuller | F28D 7/0025 |
| 2020/0329586 A1* | 10/2020 | Fuller | H05K 7/20281 |

* cited by examiner

HEAT EXCHANGER ARRANGEMENT AND METHOD FOR PRODUCING A HEAT EXCHANGER ARRANGEMENT

CROSS REFERENCE TO RELATED APPLICATION

This application claims priority to European Patent Application No. 19168012.3 filed on Apr. 9, 2019, which is hereby incorporated herewith in its entirety.

The present invention relates to a heat exchanger arrangement comprising a first heat absorbing section and a second heat releasing section. Furthermore, the present invention relates to a method for producing a heat exchanger arrangement.

TECHNOLOGICAL BACKGROUND

Heat exchangers are used in a wide range of technical applications. For example, heat exchangers are used for cooling electronics cabinets such as switch boards, control cabinets, enclosure systems or computer systems, or generally for cooling any housing enclosing heat producing components. In a cooling system, e.g. for an electronics cabinet, two heat exchanger sections are disposed in a housing comprising two compartments. A heat releasing section is disposed inside a first compartment of the housing fluidically connected to the outside of the electronics cabinet. A heat absorbing section is disposed in a second compartment of the housing fluidically connected to the interior of the electronics cabinet. Air from the interior of the electronics cabinet circulates through the second compartment and heat from the air is transferred to a refrigerant or coolant in the heat absorbing section. The heated refrigerant or coolant is guided to the heat releasing section in the first compartment, where the heat is transferred to outside air circulating through the first compartment.

Another field of application for heat exchangers is in cooling circuits or radiators for vehicles.

Prior art document DE 20 2009 006 916 U1 of the applicant discloses a cooling device for an enclosure with heat producing parts. The cooling device comprises a passive cooling system and an active cooling system, which are both disposed in a common housing.

Prior art document DE 10 2012 108 110 B4 discloses a cooling arrangement for the interior of an electronics cabinet comprising a first cooling circuit and a second cooling circuit, which is fluidically separated from the first cooling circuit.

Disclosure of the Invention: Problem, Solution, Advantages

It is the object of the present invention to provide a heat exchanger arrangement, which has a compact design and provides an effective thermal coupling of cooling circuits.

A solution to the object of the invention is provided with a heat exchanger arrangement, comprising a first heat absorbing section and a second heat releasing section, wherein a plurality of heat exchange structures are arranged, preferably in parallel to each other, in a plane of extension, wherein the first heat absorbing section comprises a first plurality of fluid guiding means and wherein the second heat releasing section comprises a second plurality of fluid guiding means, wherein each heat exchange structure comprises at least one fluid guiding means of the first plurality and at least one fluid guiding means of the second plurality thermally coupled to each other, and preferably arranged in parallel to each other, wherein a clearance is disposed between at least two adjacent heat exchange structures to allow airflow between said adjacent heat exchange structures and/or wherein each heat exchange structure comprises a heat sink to thermally couple the at least one fluid guiding means of the first plurality and the at least fluid guiding means of the second plurality.

The heat exchanger arrangement comprises at least a first and a second section, wherein the first section is configured as a heat absorbing section, which will be called in the following a first heat absorbing section, and wherein the second section is configured as a heat releasing section, which will be called in the following a second heat releasing section. Thus, the numerals "first", "second" etc. when applied to heat absorbing sections and heat releasing sections are intended to number the sections without consideration of their function of heat release and heat absorption.

In the context of the present invention heat absorbing sections and heat releasing sections are considered as physical structures comprising at least one fluid guiding means configured to hold and transport or guide a coolant or refrigerant, the heat releasing sections and heat absorbing sections further being configured such that heat carried by the fluid can be transferred to an outside of the fluid guiding means or that heat from the outside can be transferred to the coolant or refrigerant inside the fluid guiding means. As an example, the heat releasing end of a heat pipe is a heat releasing section and the heat absorbing end of the heat pipe is a heat absorbing section. Similarly, the condenser of a vapor compression cycle circuit is a heat releasing section and the evaporator of the vapor compression cycle circuit is a heat absorbing section. In the simplest form a heat absorbing section or a heat releasing section comprises just one fluid guiding means such as a tube configured for transporting a coolant or refrigerant.

The heat exchanger arrangement comprises at least a first heat absorbing section and a second heat releasing section, each section comprising a plurality of fluid guiding means. At least one fluid guiding means of the first heat absorbing section and at least one fluid guiding means of the second heat releasing section are thermally coupled to each other to form a respective heat exchange structure. The heat exchanger arrangement comprises at least two heat exchange structures arranged, preferably in parallel, in a, in particular imagined, plane of extension. The plane of extension is preferably defined as the plane in which the fluid guiding means of the first plurality of fluid guiding means of the first heat absorbing section are disposed.

An important advantage of the invention is that a clearance is disposed between two adjacent heat exchange structures to allow airflow between the adjacent heat exchange structures. Thus, heat can be transferred from the second heat releasing section to the first heat absorbing section via a transfer of heat from a fluid guiding means of the second plurality of fluid guiding means to a fluid guiding means of the first plurality of fluid guiding means via the thermal coupling and, in addition, heat can be transferred from the first heat absorbing section and/or the second heat releasing section selectively, alternatively or simultaneously to the airflow between the adjacent heat exchange structures.

Each fluid guiding means has a primary direction of extension, which preferably is the direction of the flow of the refrigerant or coolant through said fluid guiding means. The fluid guiding means of each heat exchange structure are preferably arranged parallel to each other so that their respective primary directions of extension align and that the contact surface for the heat transfer from the fluid guiding means of the second plurality to the fluid guiding means of the first plurality is increased. In addition, the heat exchange structures comprising the fluid guiding means can be arranged parallel to each other as well, so that the clearances between two adjacent heat exchanges structures extent over preferably the full length of the heat exchange structures.

The heat exchange structures additionally or alternatively comprise a respective heat sink to thermally couple the at least one fluid guiding means of the first plurality and the at least one fluid guiding means of the second plurality, thereby increasing the effectivity of heat transfer from the second plurality of fluid guiding means to the first plurality of fluid guiding means.

The heat sink of a heat exchange structure may be in thermal contact with at least one of the fluid guiding means of the adjacent heat exchange structure, so that the clearance between the two adjacent heat exchange structures is at least partially closed in the section of the heat exchanger arrangement where the heat sinks are located. Airflow through the heat exchange arrangement may still be possible in the section of the heat exchanger arrangement, where the heat sinks are not disposed or the heat sinks may be configured with flow channels to allow airflow between adjacent heat exchange structures.

Furthermore, the heat sinks may extent over the full length of the heat exchanger arrangement, in particular over the full length of the first heat absorbing section and/or the second heat releasing section. If airflow channels are provided, air can still flow between adjacent heat exchange structures. In an alternative configuration, the heat sinks extend over the full length of the heat exchanger arrangement and no airflow channels are provided. In this case airflow between adjacent heat exchange structures is substantially or completely prevented.

Preferably the heat exchanger arrangement comprises a third heat absorbing section, wherein the second heat releasing section and the third heat absorbing section form a first cooling circuit.

Furthermore preferably, the first cooling circuit is a passive or an active cooling circuit, and/or the first cooling circuit comprises a coolant or a refrigerant, and/or the first cooling circuit is a chiller, a refrigerating machine, a vapor compression cycle circuit, a heat pipe, a thermosiphon, a pulsating heat pipe, an absorption cooling machine or an adsorption cooing machine.

The heat exchanger arrangement can be configured for the use in cooling systems for electronics cabinets such as switch boards, control cabinets, enclosure systems or computer systems, or generally for any housing enclosing heat producing components. In addition, the heat exchanger arrangement can be configured for use in a cooling system or radiator of a vehicle.

It is particularly preferable that the first cooling circuit is a passive cooling circuit configured as a heat pipe, a thermosiphon or a pulsating heat pipe.

Furthermore preferably, the third heat absorbing section comprises a third plurality of fluid guiding means.

It may also be preferred that the fluid guiding means of the first plurality and/or the second plurality and/or the third plurality are fluidically interconnected in a serpentine configuration, and/or that in each case a fluid guiding means of the second plurality and a fluid guiding means of the third plurality form a combined fluid guiding means, wherein the combined fluid guiding means are preferably fluidically interconnected in a serpentine configuration.

Thus, the plurality of fluid guiding means of the first plurality and/or the second plurality are not necessarily fluidically separated from each other, but may be interconnected in a serpentine configuration. The interconnection can be realized by connecting the ends of adjacent fluid guiding means of the first plurality or of the second plurality with bent sections.

A serpentine configuration of the fluid guiding means of the first plurality and/or of the second plurality and/or of the third plurality is in particular advantageous, if the first heat absorbing section and/or the second heat releasing section and/or the third heat absorbing section is configured as a pulsating heat pipe.

In addition, the second plurality of fluid guiding means and the third plurality of fluid guiding means may be arranged such, that each fluid guiding means of the second plurality and is directly connected to a fluid guiding means of the third plurality, preferably in the primary direction of extension of the fluid guiding means, to form a combined fluid guiding means. The configuration of combined fluid guiding means is particularly advantageous when the first cooling circuit is configured as a heat pipe, a thermosiphon or a pulsating heat pipe.

Preferably the first heat absorbing section is an evaporator for a second cooling circuit, and/or the second heat releasing section is a condenser, and/or the thermal coupling between the fluid guiding means of the first plurality and the fluid guiding means of the second plurality extends over a part or over a full length of the second heat releasing section.

It is particularly advantageous if the first heat absorbing section is an evaporator for a second cooling circuit configured as a vapor compression cycle circuit and if the second heat releasing section is a condenser of a heat pipe, thermosiphon or pulsating heat pipe.

Furthermore, if the thermal coupling extends over a part of the second heat releasing section the remaining part of the second heat releasing section can project over the first heat absorbing section so that the projecting section of the second heat releasing section can be operated as a not thermally coupled heat releasing section, while the part of the heat exchanger arrangement where the thermal coupling of the first heat absorbing section and the second heat releasing section is realized allows for a heat transfer between the first heat absorbing section and the second heat releasing section.

Depending on the desired configuration it may be advantageous that the thermal coupling between the fluid guiding means of the first plurality and the second plurality extends over the full length of the second heat releasing section, thereby increasing the thermal coupling of the first heat absorbing section and the second heat releasing section.

Furthermore preferably, the fluid guiding means of the first plurality and/or the fluid guiding means of the second plurality and/or the fluid guiding means of the third plurality can be configured plate-like or strip-like.

With a plate-like or strip-like configuration of the first plurality of fluid guiding means and/or of the second plurality of fluid guiding means the thermal coupling between the fluid guiding means of the first and of the second plurality can be improved, in particular, when the fluid guiding means are attached face-to-face to each other via their surfaces of largest area.

Advantageously, the fluid guiding means of the first plurality and/or the fluid guiding means of the second plurality and/or the fluid guiding means of the third plurality comprise at least one internal fluid channel.

The at least one fluid channel can be a microchannel.

The first heat absorbing section can be configured to comprise or comprises a refrigerant or coolant with a Global Warming Potential (GWP) of less than 1000, preferably of less than 100, more preferably of less than 10, further preferably of less than 5, still further preferably of less than 3.

By using a refrigerant or coolant with a low GWP, the heat exchanger arrangement is advantageously environmental friendly.

Still further preferably, the first cooling circuit is configured to comprise or comprises an incombustible or unharmful refrigerant or coolant, and/or the first heat absorbing section is configured to comprise or comprises a combustible or harmful refrigerant, in particular propane.

Thus, different refrigerants or coolants can be used in the first cooling circuit and the second cooling circuit. The combination of an incombustible or unharmful refrigerant or coolant in the first cooling circuit, in particular in the second heat releasing section and/or third heat absorbing section, and of a combustible or harmful refrigerant or coolant in the second cooling circuit, in particular in the first heat absorbing section, is advantageous when the heat exchanger arrangement is used in a cooling system for an electronics cabinet. In electronics cabinets safety and ingress protection regulations require, that a cooling circuit configured for transferring heat out of the cabinet does not comprise a combustible refrigerant or coolant because of the risk of spark ignition in case of a leakage of the refrigerant or coolant. However, incombustible coolants or refrigerants usually have a very high GWP, which makes their use undesirable for environmental reasons. When the second cooling circuit, in particular the first heat absorbing section, comprises a combustible refrigerant, a refrigerant or coolant with a low GWP can be chosen, thereby increasing the environmental friendliness of the cooling system. In this case the second cooling circuit, in particular the first heat absorbing section should be disposed outside of the electronics cabinet, for example in a first compartment of a housing of the cooling system, wherein the first compartment is fluidically connected to the exterior of the electronics cabinet and sealed off against the interior of the electronics cabinet.

Furthermore preferably, the heat exchanger arrangement may comprise an airflow regulation flap arranged on the first heat absorbing section and/or on the second heat releasing section, which in an open position allows airflow through the heat exchanger arrangement, in particular through the first heat absorbing section and/or the second heat releasing section, and which in a closed position at least partially prevents airflow through the heat exchanger arrangement, in particular through the first heat absorbing section and/or the second heat releasing section The airflow regulation flap is preferably configured such that it can be swivelled between an open position and a closed position. In the closed position it is preferred that the airflow regulation flap covers the clearances between the heat exchange structures at least partially to prevent airflow through the heat exchanger arrangement. Preventing airflow through the clearances of the heat exchanger arrangement can be beneficial in cases where it is desired to have the most effective thermal coupling between the first cooling circuit comprising the second heat releasing section and the second cooling circuit comprising the first heat absorbing section, because transfer of thermal energy to the airflow through the heat exchanger arrangement is limited or prevented when the airflow regulation flap is in the closed position.

Cooling elements can be arranged in the clearance between two adjacent heat exchange structures and interconnecting the adjacent heat exchange structures.

Preferably the cooling elements are cooling fins.

With cooling elements, in particular with cooling fins, in the clearances between two adjacent heat exchange structures heat from the second heat releasing section or the fluid guiding means of the second heat releasing section can be more effectively transferred from the refrigerant or coolant in the fluid guiding means to the airflow through said clearances.

Advantageously the cooling fins are pleated.

Still further, the fluid guiding means of the first plurality and the fluid guiding means of the second plurality and the cooling elements, in particular the cooling fins, can be arranged in the plane of extension.

When the fluid guiding means of the first plurality and the fluid guiding means of the second plurality and the cooling elements all are arranged in the plane of extension a very compact heat exchanger arrangement is provided.

Preferably the heat exchange structure may comprise exactly one fluid guiding means of the first plurality and exactly one fluid guiding means of the second plurality, or in the heat exchange structure one fluid guiding means of the first plurality is arranged between and thermally coupled to two fluid guiding means of the second plurality.

By providing exactly one fluid guiding means of the first plurality and exactly one fluid guiding means of the second plurality in each heat exchange structure the heat arrangement can be configured in a very compact way.

On the other hand, if in each heat exchange structure one fluid guiding means of the first plurality is arranged between and thermally coupled to fluid guiding means of the second plurality, heat transfer from the second heat releasing section to the first heat absorbing section can be improved, because the fluid guiding means of the first plurality of the first heat absorbing section are not in contact with the surrounding air, in particular with the airflow through the clearances.

Still further preferably the first heat absorbing section may comprise an intake manifold and an outlet manifold, wherein the first plurality of fluid guiding means are fluidically connected to the intake manifold and to the outlet manifold, preferably at opposing ends of the fluid guiding means.

The provision of an intake manifold and an outlet manifold is in particular advantageous, if the first plurality of fluid guiding means are not interconnected in a serpentine configuration.

The outlet manifold and the intake manifold of the first heat absorbing section can be arranged on opposing sides of the second heat releasing section and/or of the plane of extension, or the outlet manifold and the intake manifold of the first heat absorbing section can be arranged on the same side of the second heat releasing section and/or of the plane of extension.

By arranging the outlet manifold and the intake manifold on opposing sides of the second heat releasing section and/or of the plane of the extension or on the same side of the second heat releasing section and/or of the plane of extension the heat exchanger arrangement can be easily adapted to different cooling systems.

The outlet manifold and/or the intake manifold may also be arranged in the plane of extension, and the fluid guiding means of the second plurality can preferably extend through the intake manifold and/or the outlet manifold.

By positioning the outlet manifold and/or the intake manifold of the first heat absorbing section in the plane of extension the width of the heat exchanger arrangement can be further reduced and a more compact heat exchanger arrangement is provided.

Preferably, the fluid guiding means of the second plurality or the combined fluid guiding means are fluidically connected to an intake header and/or to an outlet header, and the intake header and/or the outlet header are preferably arranged in the plane of extension.

Preferably, the fluid guiding means of the first plurality and of the second plurality are configured plate-like or strip-like or stripe-like and are connected to each other via their respective surface with the largest area.

The fluid guiding means of the heat exchange structures can be thermally coupled by a material connection.

With a material connection the heat transfer between the fluid guiding means of the first plurality and the second plurality is improved. However, it is also possible that a heat transfer medium like a thermal grease is disposed between thermally coupled fluid guiding means of the first plurality and the second plurality.

In a preferred embodiment the fluid guiding means of the first plurality and the fluid guiding means of the second plurality comprise a core of a first material, in particular of a first metal or alloy, and a surface layer of a second material, in particular of a second metal or alloy.

The second material of the surface layer can have a lower melting temperature than the first material of the core.

Thus by, partially melting the material of the surface layers of opposing fluid guiding means a material connection between the fluid guiding means of the first plurality and the fluid guiding means of the second plurality can be provided, without affecting the core of the respective fluid guiding means. This allows for a material connection between adjacent fluid guiding means, wherein the core regions of the fluid guiding means are still intact and therefore provide a double separation wall between the refrigerant or coolant in the first fluid guiding means and the refrigerant or coolant in the second fluid guiding means.

Alternatively or additionally the fluid guiding means of the first plurality are disposed in the, in particular imagined, plane of extension and the fluid guiding means of the second plurality are disposed in a, in particular imagined, second plane parallel to the plane of extension and the heat sink of each heat exchange structure is disposed at a preferably right angle to the plane of extension and at least partially arranged in the plane of extension and the second plane.

It is in particular preferable that heat sinks provide the thermal coupling between the fluid guiding means. When the fluid guiding means of the first plurality and of the second plurality are disposed in parallel but different planes and in particular if fluid guiding means are configured strip-like or plate-like, the fluid guiding means in the first plurality are in contact with the fluid guiding means of the second plurality via their thin sides and, therefore, the heat transfer is not as effective as when the fluid guiding means are in contact with their flat sides of largest surface area.

Therefore, it can be advantageous when the fluid guiding means of the first plurality are in contact with the heat sink with their flat side. Since the heat sinks extend into the second plane parallel to the plane of extension they are also in contact with the flat sides of largest surface area of the fluid guiding means of the second plurality, thereby improving the heat transfer from the first fluid guiding means to the second fluid guiding means.

Between adjacent heat exchange structures comprising the heat sinks a clearance can be provided. However, it is also possible that the heat sink of a heat exchange structure is in contact with the fluid guiding means of the adjacent heat exchange structure to partially or fully prevent airflow between adjacent heat exchange structures.

When the heat sinks are in contact with fluid guiding means of an adjacent heat exchange structure the thermal transfer is further improved and in particular, an even temperature distribution over the heat exchange structure is obtained.

Preferably the heat sink of each heat exchange structure is configured as a, in particular solid, block of a metal or an alloy, in particular of aluminum.

Still further preferably the heat sink of each of the heat exchange structure is in thermal contact with at least one of the respective fluid guiding means of the adjacent heat exchange structure.

Still further, the heat sinks of the heat exchange structures are in, particular materially, connected to each other on one side.

Thus, the heat sinks can be connected to each other and in a side view have a comb-like appearance. This configuration improves the manufacturing of the heat exchange arrangement because the heat sinks of the heat exchange structures can be handled together in one piece.

A further solution of the object of the invention is the provision of a method for producing a heat exchanger arrangement comprising the step of Thermally connecting a fluid guiding means of a first plurality of fluid guiding means and a fluid guiding means of a second plurality of fluid guiding means to form a heat exchange structure, Arranging a plurality of heat exchange structures in a plane of extension and interconnecting adjacent heat exchange structure with, in particular pleated, cooling fins, Attaching an intake manifold and an outlet manifold to the opposite ends of the fluid guiding means of the first plurality.

With the inventive method heat exchanger arrangements as described above can be manufactured.

Preferably the fluid guiding means of the first plurality and the fluid guiding means of the second plurality comprise a core of a first material, in particular of a first metal or alloy, and a surface layer of a second material, in particular of a second metal or alloy, the method further comprising the step of thermally coupling in each case a fluid guiding means of the first plurality and a fluid guiding means of the second plurality with a material connection by partially melting the surface layers of the fluid guiding means.

The cooling fins may be welded or soldered to the heat exchange structures. In addition, the intake manifold and the outlet manifold may be welded or solderd to the opposite ends of the fluid guiding means of the first plurality. Still further, an intake header and/or an outlet header may be welded or soldered to the fluid guiding means of the second plurality.

The second material may be roll cladded on the cores of the fluid guiding means to form the surface layer.

Still further, the invention provides the use of a heat exchanger arrangement as described above in a cooling system, in particular for an electronics cabinet.

SHORT DESCRIPTION OF THE FIGURES

The invention is described in more detail with reference to the Figures.

Figure 7:
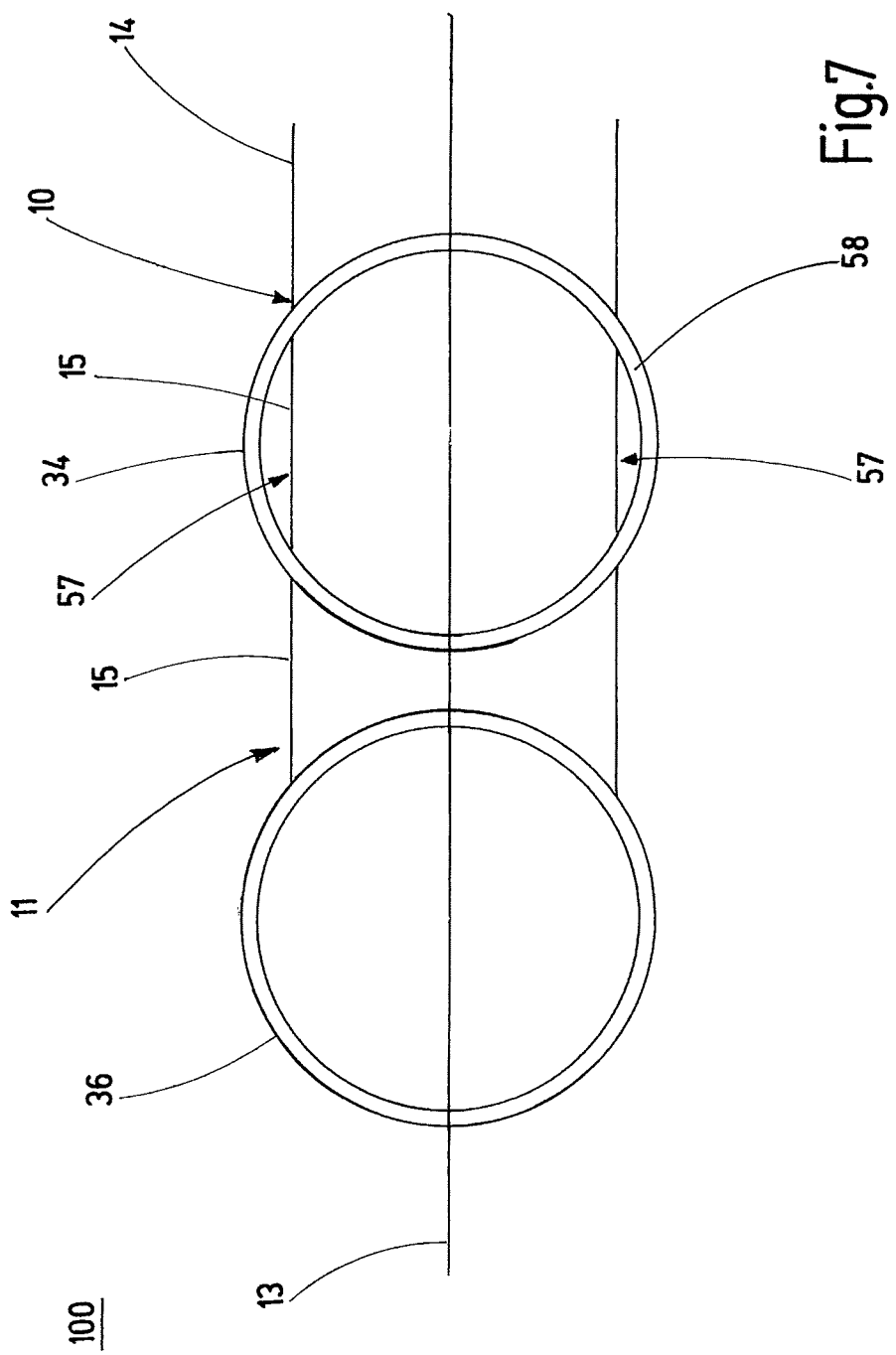
Figure 8:
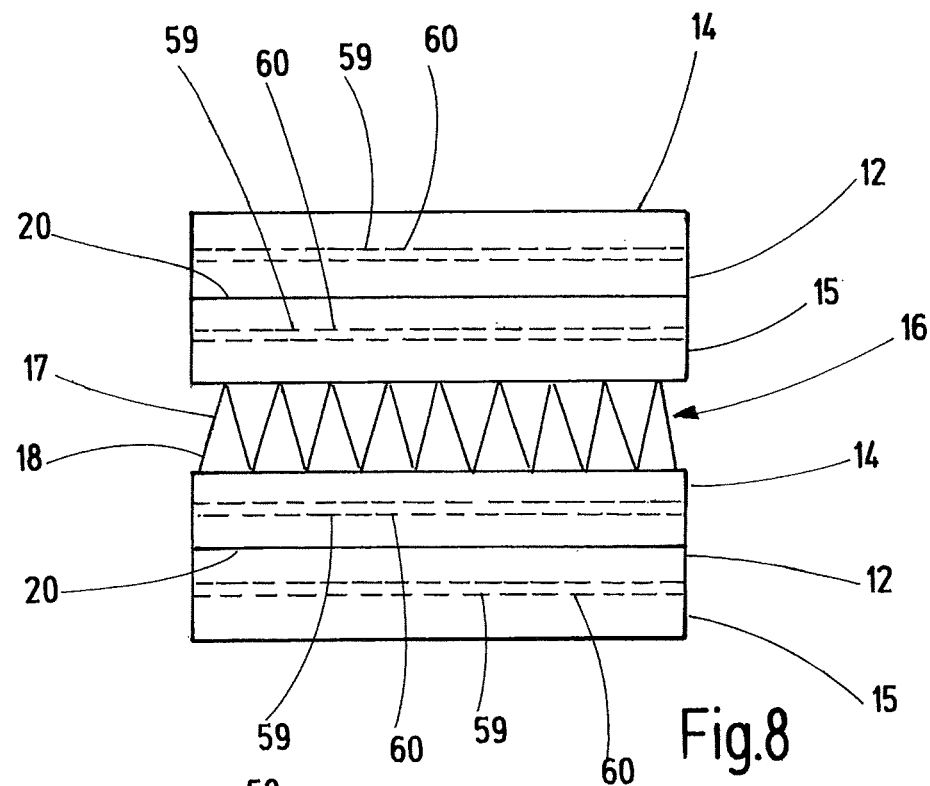
Figure 9:
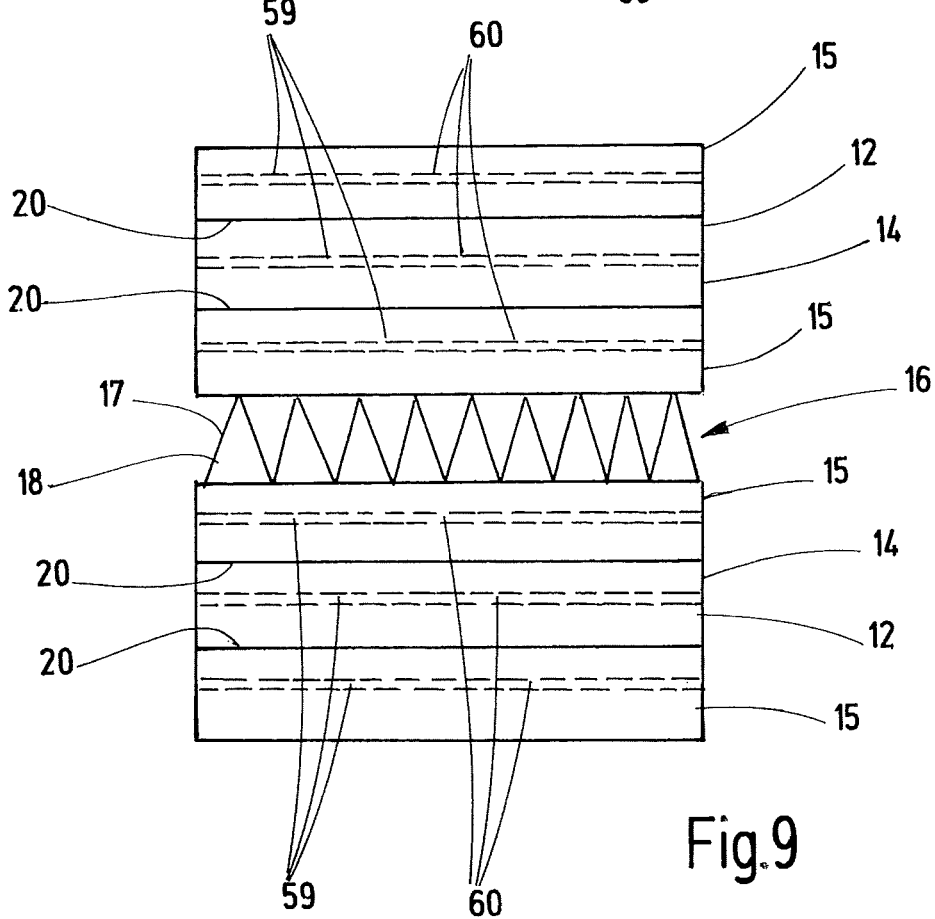
Figure 10:
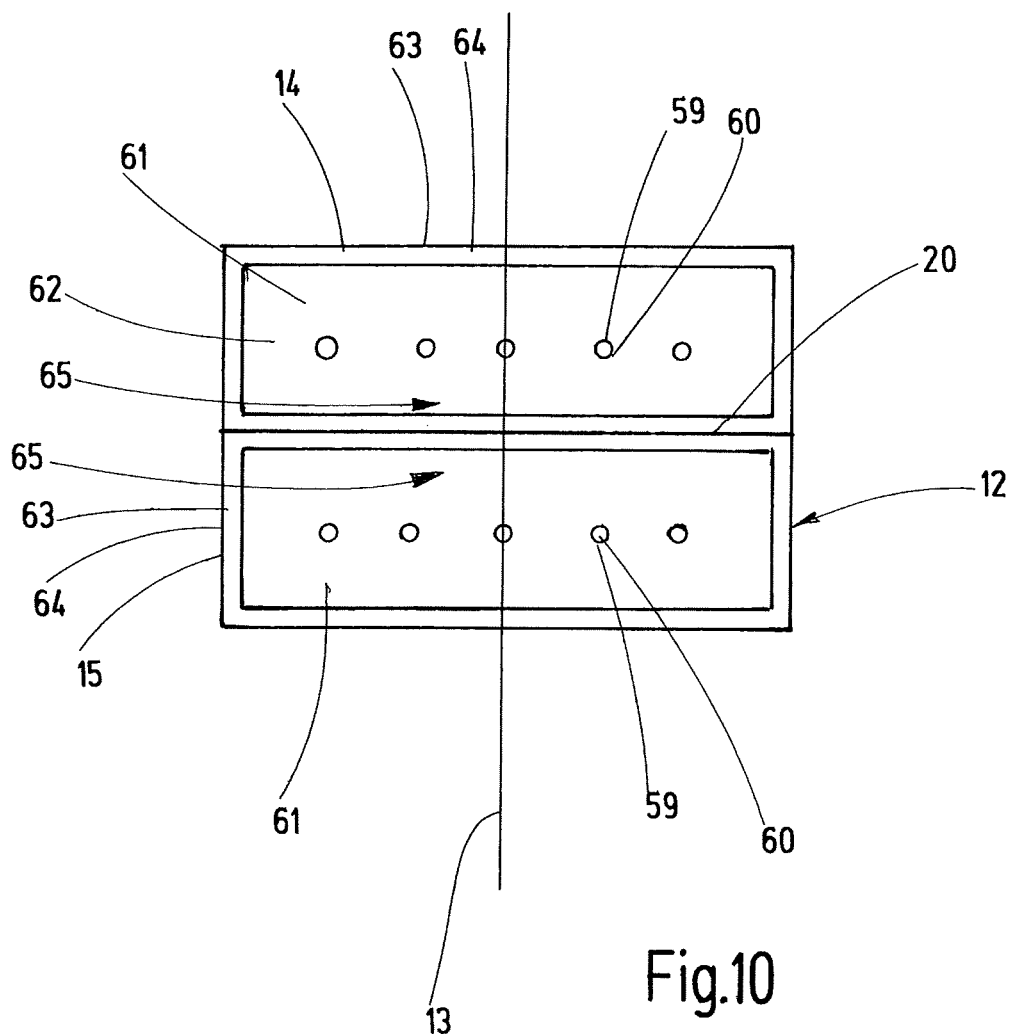
Figure 11:
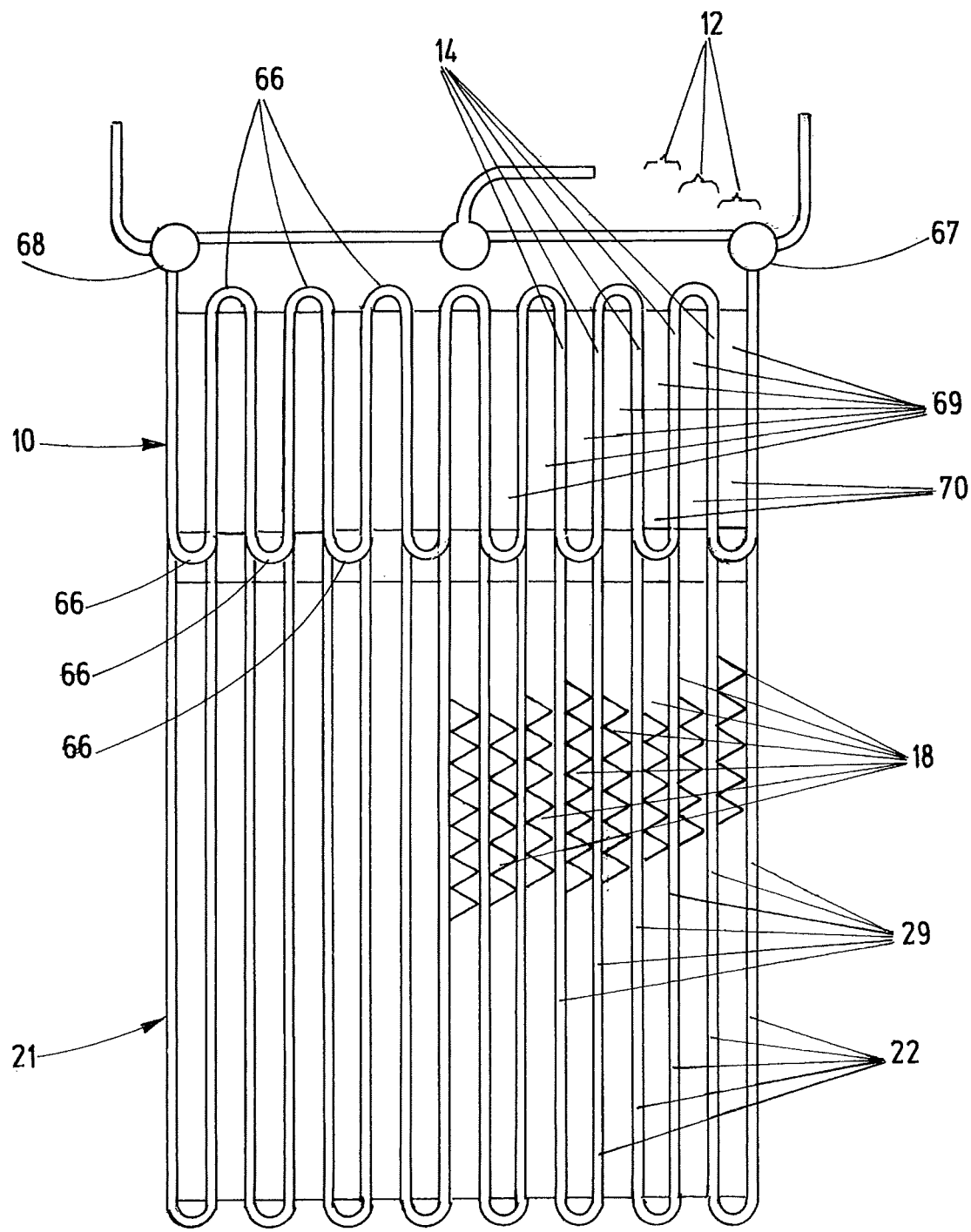
Figure 12:
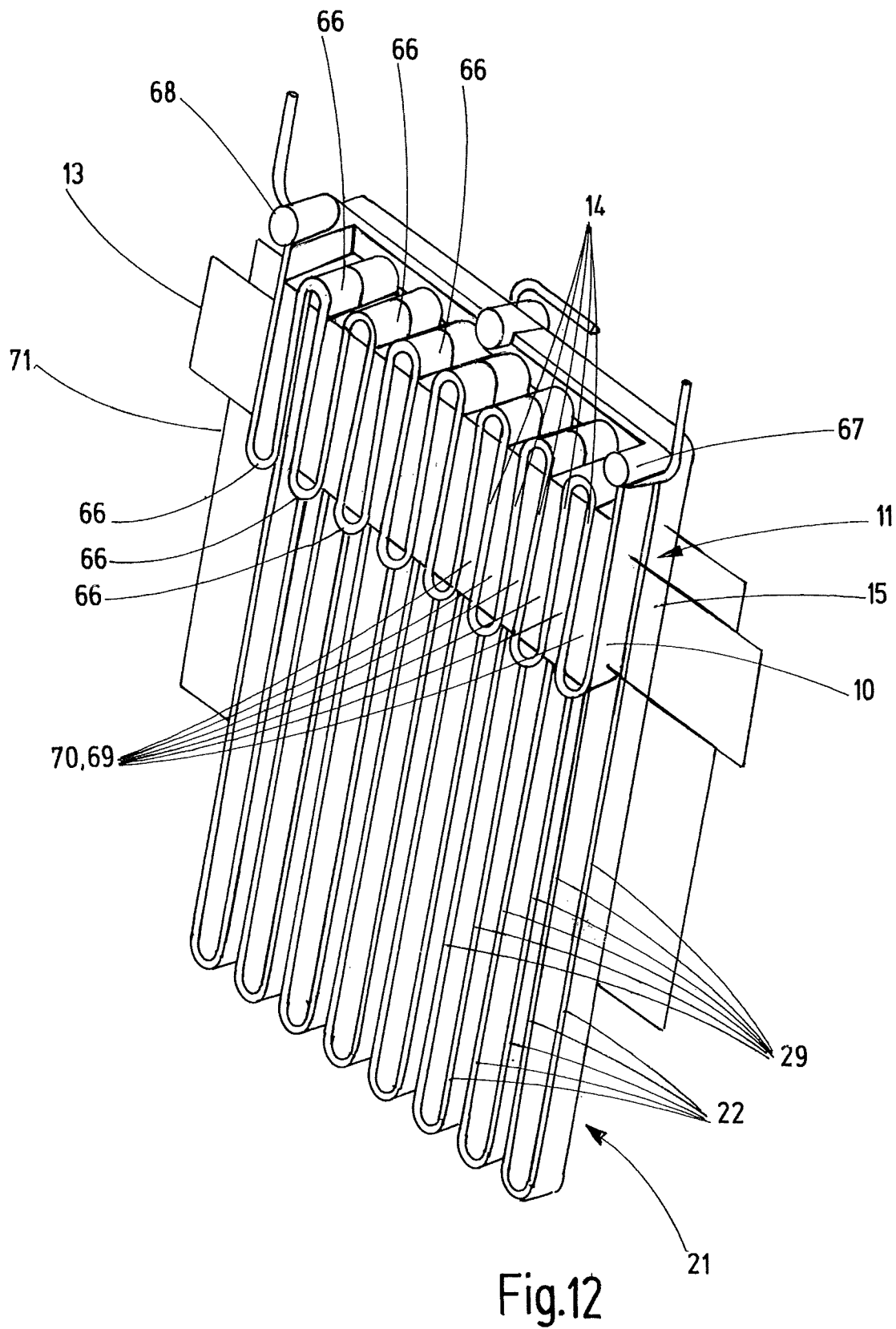
Figure 13:
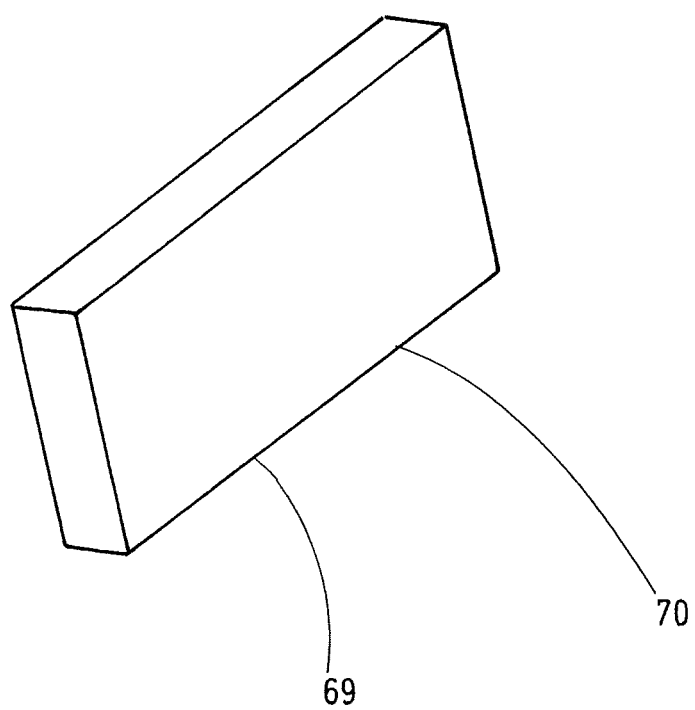
Figure 14:
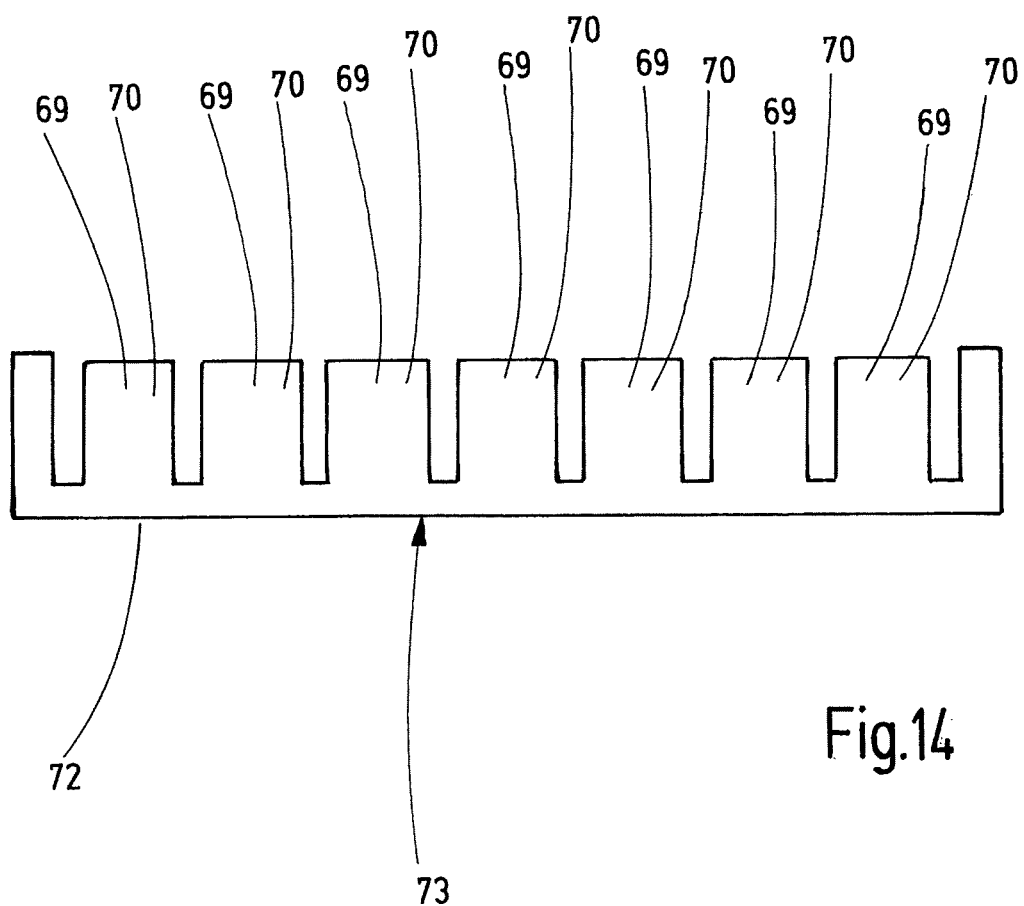
Figure 15:
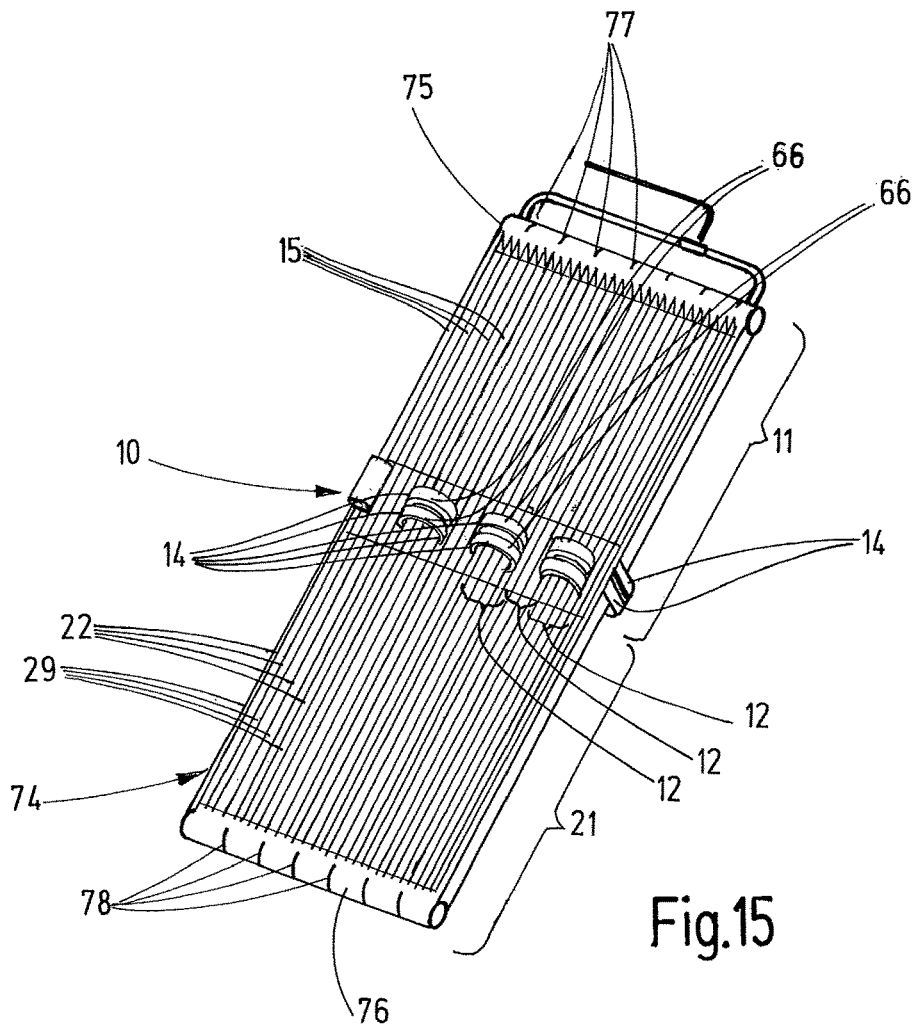
Figure 16:
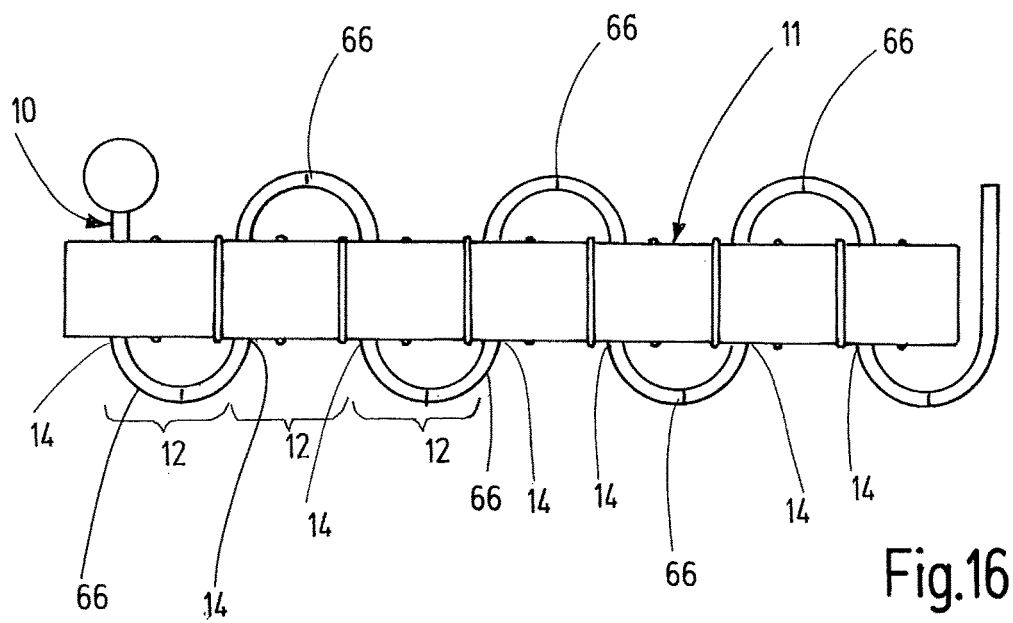
Figure 17:
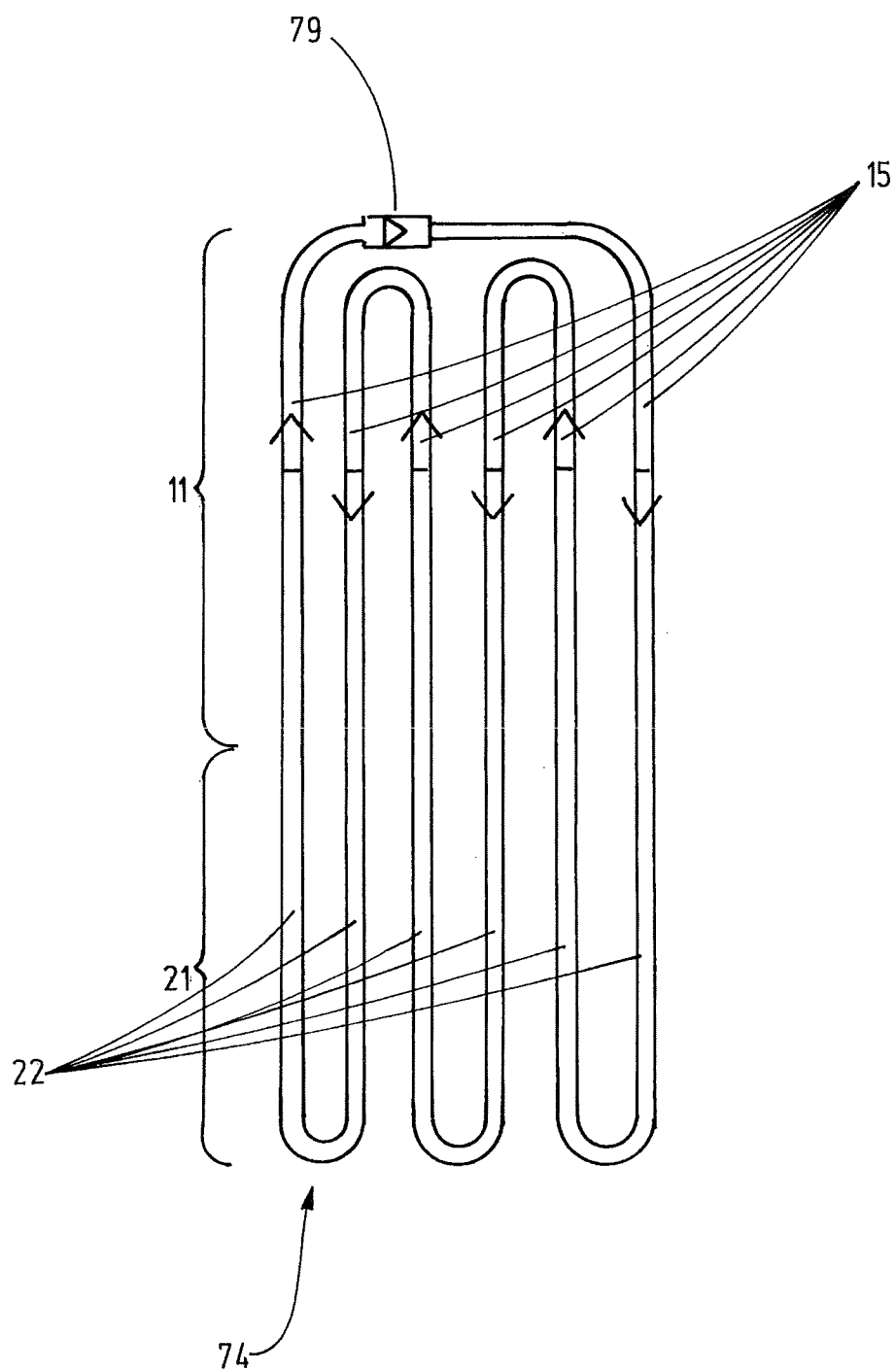

FIG. 7 shows a top view of an outlet manifold of the fifth configuration of a heat exchanger arrangement, FIG. 8 shows a first configuration of a heat exchange structure, FIG. 9 shows a second configuration of a heat exchange structure, FIG. 10 shows cross section of the first configuration of a heat exchange structure, FIG. 11 shows a side view of a sixth configuration of a heat exchanger arrangement, FIG. 12 shows a perspective view of the sixth configuration of a heat exchanger arrangement, FIG. 13 shows a heat sink, FIG. 14 shows a heat sink module, FIG. 15 shows a seventh configuration of a heat exchanger arrangement, FIG. 16 shows a cross section of the seventh configuration of a heat exchanger arrangement, and FIG. 17 shows a schematic view of a pulsating heat pipe comprising a second heat releasing section and a third heat absorbing section.

DETAILED DESCRIPTION OF THE FIGURES

Figure 1:
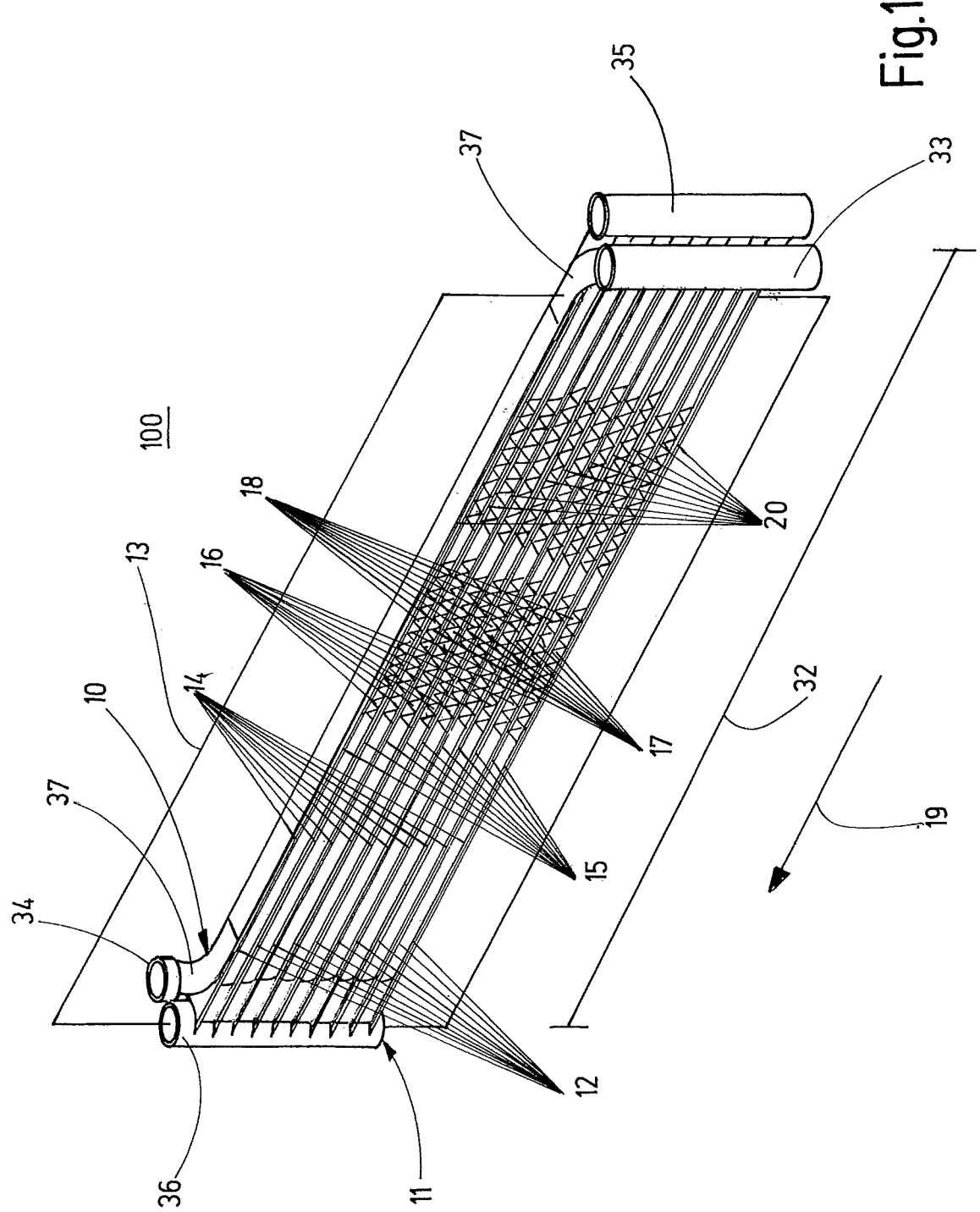
FIG. 1 shows a first configuration of a heat exchanger arrangement.

FIG. 1 shows a heat exchanger arrangement 100 comprising a first heat absorbing section 10 and a second heat releasing section 11. The heat exchanger arrangement 100 consists of a plurality of heat exchange structures 12 which are arranged in parallel to each other in an imagined plane of extension 13. The first heat absorbing section 10 comprises a first plurality of fluid guiding means 14 and the second heat releasing section 11 comprises a second plurality of fluid guiding means 15. Each heat exchange structure 12 comprises at least one fluid guiding means 14 of the first plurality and at least one fluid guiding means 15 of the second plurality, which are arranged in parallel and thermally connected to each other. The imagined plane of extension 13 is defined and oriented so that the fluid guiding means 14 of the first plurality are disposed in said plane of extension 13. In the heat exchanger arrangement 100 of FIG. 1 the fluid guiding means 15 of the second plurality are also disposed in the plane of extension 13. Clearances 16 are formed between adjacent heat exchange structures 12 to allow airflow between the adjacent heat exchange structures 12. Cooling elements 17 are disposed in the clearances 16. The cooling elements 17 are configured as pleated cooling fins 18. The cooling elements 17, in particular the cooling fins 18, are shown only in sections for better visibility. However, the cooling elements 17, in particular the cooling fins 18, may be provided over the full length of the clearances 16 between the heat exchange structures 12. The fluid guiding means 14 of the first plurality and the fluid guiding means 15 of the second plurality are configured strip-like or plate-like and arranged parallel to each other in their primary direction of extension 19. In each case a fluid guiding means 14 of the first plurality and a fluid guiding means 15 of the second plurality are in thermal contact with each other via a material connection 20.

The second heat releasing section 11 has a length 32 measured in the primary direction of extension 19. The thermal coupling between the fluid guiding means 14 of the first plurality and the fluid guiding means 15 of the second plurality extends over substantially the full length 32 of the second heat releasing section 11. The first heat absorbing section 10 comprises an intake manifold 33 and an outlet manifold 34. Similarly, the second heat releasing section 11 comprises an intake header 35 and an outlet header 36. The fluid guiding means 14 of the first plurality are fluidically connected to intake manifold 33 and outtake manifold 34. Fluid guiding means 15 of the second plurality are fluidically connected to intake header 35 and outlet header 36. The intake manifold 33 and the outlet manifold 34 are connected to the fluid guiding element 14 of the first plurality via bent segments 37 so that intake manifold 33 and the outlet manifold 34 are disposed on opposing sides of the second heat releasing section 11 and of the plane of extension 13, respectively.

Figure 2:
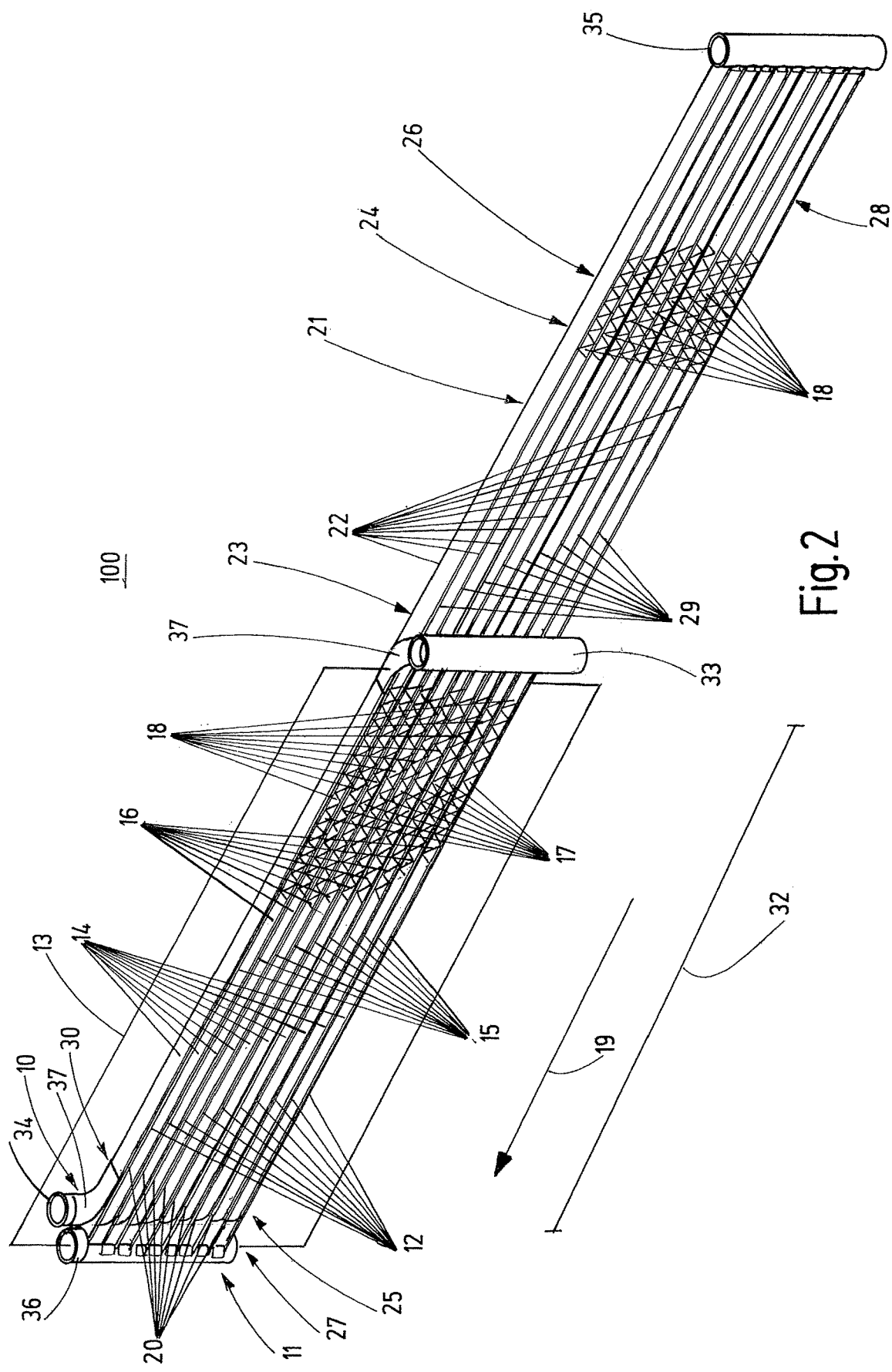
FIG. 2 shows a second configuration of a heat exchanger arrangement.
Figure 3:
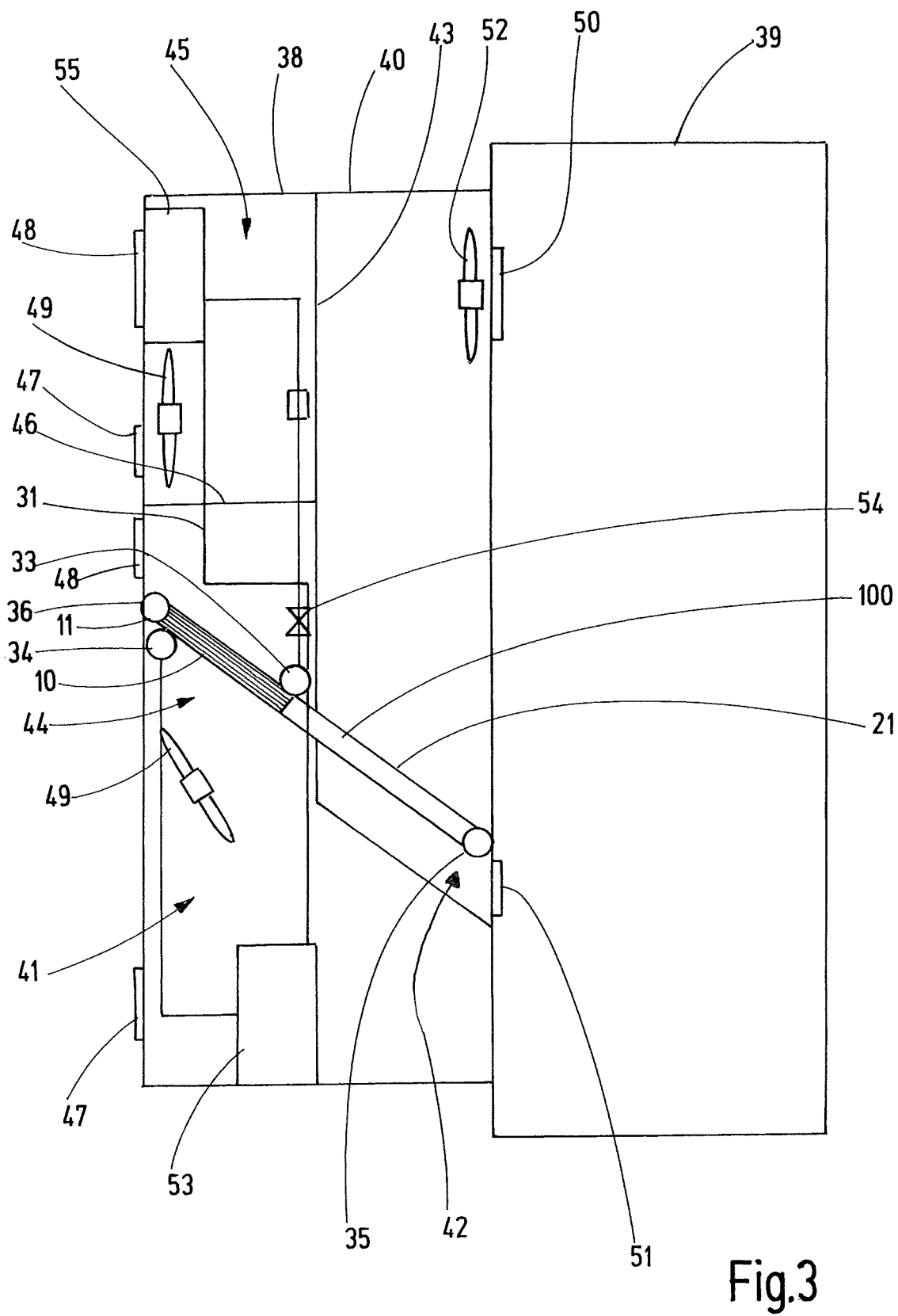
FIG. 3 shows a cooling system comprising a heat exchanger arrangement

FIG. 2 shows a second embodiment of the heat exchanger arrangement 100 according to FIG. 1, wherein the heat exchanger arrangement 100 further comprising a third heat absorbing section 21 which comprises a third plurality of fluid guiding means 22. The fluid guiding means 22 of the third plurality are arranged parallel to each other and are connected to each other via pleated cooling fins 18. The second heat releasing section 11 and the third heat absorbing section form a first cooling circuit 23. In the embodiment of FIG. 2 the first cooling circuit 23 is configured as a heat pipe 24 in which the second heat releasing section 11 is a heat releasing end 25. The third heat absorbing section 21 is a heat absorbing end 26 of the heat pipe 24. Thus, the heat releasing end 25 is configured as a condenser 27 of heat pipe 24 and the heat absorbing end 26 is configured as an evaporator 28 of heat pipe 24. In each case a fluid guiding means 22 of the third plurality and a fluid guiding means 15 of the second plurality are directly connected to each other and form a combined fluid guiding means 29. In other words, the combined fluid guiding means 29 comprising the fluid guiding means 22 of the third plurality and the fluid guiding means 15 of the second plurality together with intake header 35 and outlet header 36 form heat pipe 24, wherein only the second heat releasing section 11 of heat pipe 24 is thermally coupled to the first heat absorbing section 10. The first heat absorbing section 10 is configured as an evaporator 30 of an active second cooling circuit 31 (FIG. 3). As in FIG. 1, the cooling elements 17, in particular the cooling fins 18, may be provided over the full length of the clearances 16 between the heat exchange structures 12 and over the full length of the clearances 16 between the fluid guiding means 22 of the third plurality.

Heat pipe 24 comprising the second heat releasing section 11 and the third heat absorbing section 21 comprises an intake header 35 and an outlet header 36. The combined fluid guiding means 29 are fluidically connected to intake header 35 and outlet header 36. The first heat absorbing section 10 is preferably configured to comprise a refrigerant with a low GWP, for example propane.

The heat exchanger arrangement 100 of FIG. 2 can be used in a cooling system 38 for an electronics cabinet 39 as shown in FIG. 3. The cooling system 38 comprises a housing 40 with a first compartment 41 and a second compartment 42 separated by a gas tight partition wall 43. The first compartment 41 is subdivided into a first volume 44 and a second volume 45 by a separation wall 46. The first volume 44 and the second volume 45 of the first compartment 41 each comprise a respective inlet opening 47 and a respective outlet opening 48 for air from the outside of the housing 40 and of electronics cabinet 39. Furthermore, the first volume 44 and the second volume 45 each comprise a fan 49. The second compartment 42 also comprises an inlet opening 50 and an outlet opening 51 for air from an inside of the electronics cabinet 39. Furthermore, the second compartment 42 comprises a fan 52.

The cooling system 39 of FIG. 3 comprises a heat exchanger arrangement 100 according to FIG. 2. The first heat absorbing section 10 of the second cooling circuit 31 and the second heat releasing section 11 of the heat pipe 24 are both located in the first volume 44 of the first compartment 41. The third heat absorbing section 21 of heat pipe 24 is disposed in the second compartment 42. The partition wall 43 is configured gas tight, so that no gas exchange is possible between the first compartment 41 and the second compartment 42. The first volume 44 furthermore comprises a compressor 53 and an expansion valve 54 of the second cooling circuit 31. The second volume 45 comprises a condenser 55 of the second cooling circuit 31. In operation, air from the inside of electronics cabinet 39 is circulated by fan 52 through the second compartment 42 and heat is absorbed by the third heat absorbing section 21 of heat pipe 24. An evaporated refrigerant in heat pipe 24 is guided to the second heat releasing section 11 located in the first volume 44 of the first compartment 41.

Because of the thermal coupling of the first heat absorbing section 10 and the second heat releasing section 11 heat from the second heat releasing section 11 of the heat pipe 24 is transferred to the first heat absorbing section 10 of the second cooling circuit 31. An evaporated refrigerant in second cooling circuit 31 is guided to the condenser 55 of the second cooling circuit 31 where the heat is released to the outside with airflow generated by fan 49 in the second volume 45. In addition, fan 49 in the first volume 44 drives an airflow through the clearances 16 between the heat exchange structures 12 of the heat exchanger arrangement 100 shown in FIG. 2. Air heated via cooling fins 18 is released to the outside through outlet opening 48 of the second volume 45.

Figure 4:
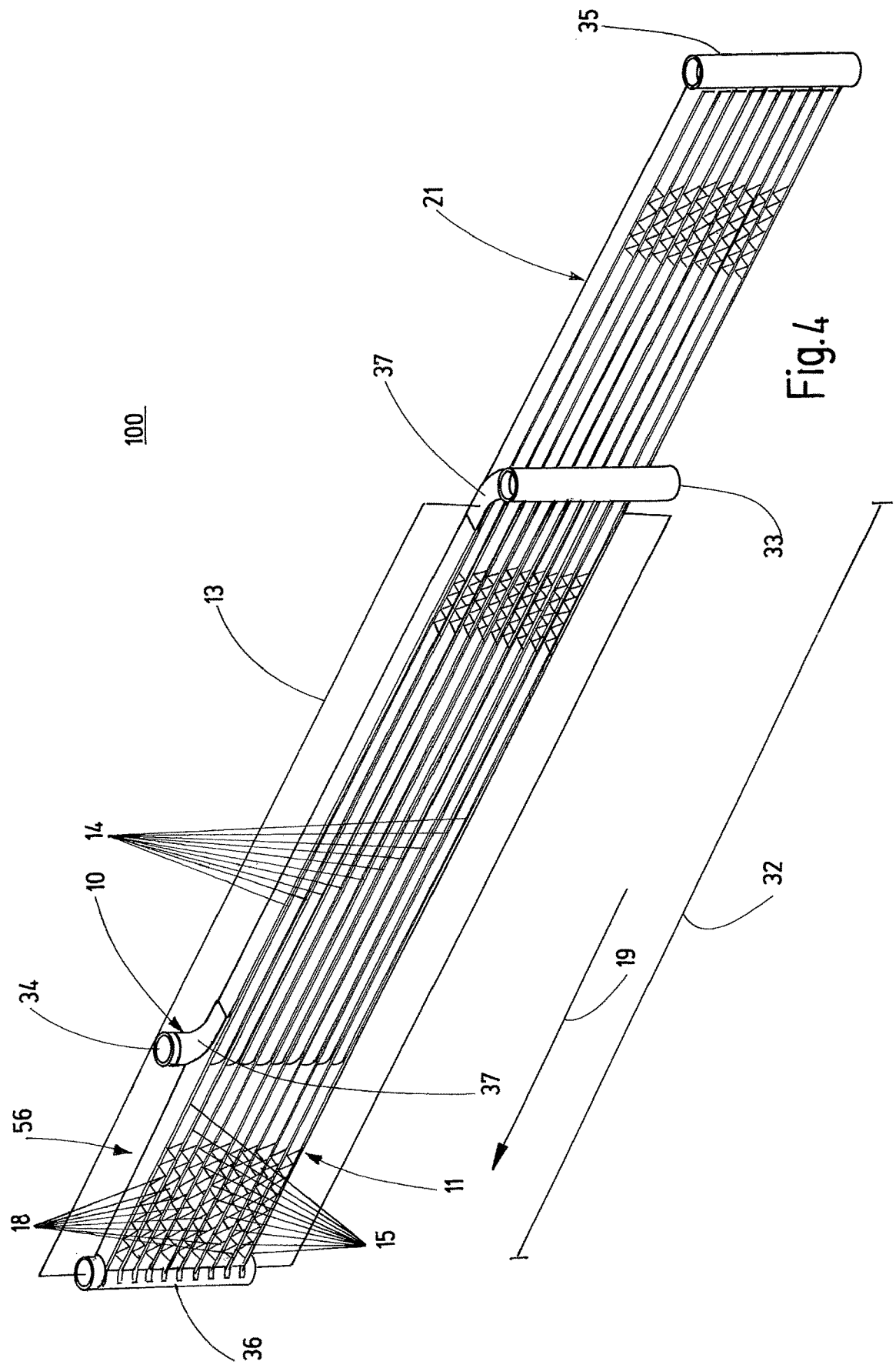
FIG. 4 shows a third configuration of a heat exchanger arrangement.

FIG. 4 shows a third configuration of heat exchanger arrangement 100. The heat exchanger arrangement 100 of FIG. 4 is substantially identical to the heat exchanger arrangement 100 of FIG. 2 and differs only in that the thermal coupling between the first heat absorbing section 10 and the second heat releasing section 11, i.e. the thermal coupling between the fluid guiding means 14 of the first plurality and the fluid guiding means 15 of the second plurality extends only over a part of the length 32 of the second heat releasing section 11. Thus, second heat releasing section 11 comprises a projecting section 56, which projects over the first heat absorbing section 10 in the direction of primary extension 19. The projecting section 56 of the second heat releasing section 11 functions in operation as a heat releasing end 25 which releases heat only to the airflow through clearances 16 with cooling fins 18.

Figure 5:
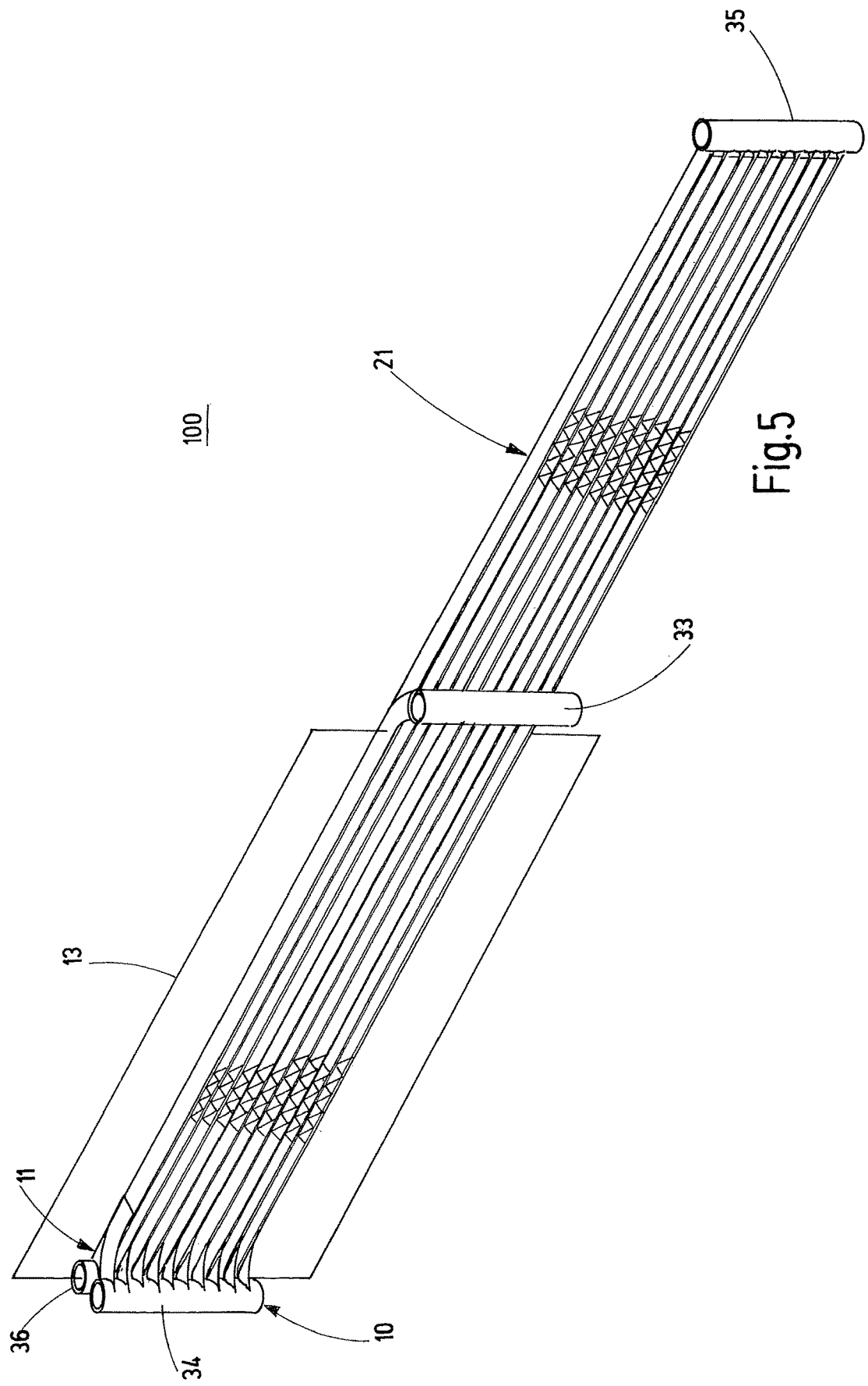
FIG. 5 shows a fourth configuration of a heat exchanger arrangement.

FIG. 5 shows a fourth configuration of heat exchanger arrangement 100. The heat exchanger arrangement 100 according to FIG. 5 is substantially identical to the heat exchanger arrangement 100 according to FIG. 2. The only difference is that the intake manifold 33 and the outtake manifold 34 of the first heat absorbing section 10 are disposed on the same side of the second heat releasing section 11 and of the plane of extension 13, respectively.

Figure 6:
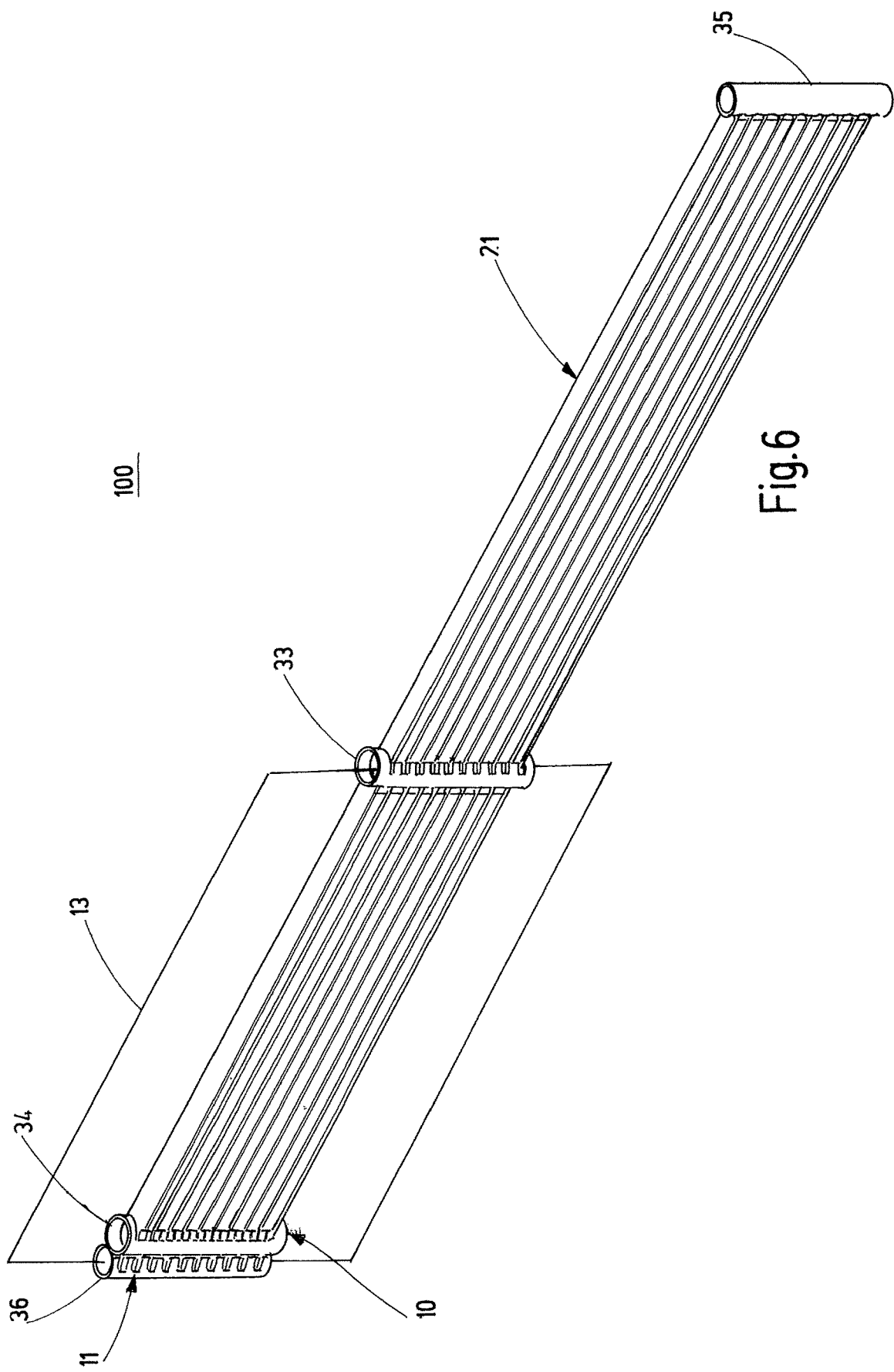
FIG. 6 shows a fifth configuration of a heat exchanger arrangement.

FIG. 6 shows a fifth embodiment of the heat exchanger arrangement 100. The heat exchanger arrangement 100 of FIG. 6 is substantially identical to the heat exchanger arrangement 100 of FIG. 2. The difference of the heat exchanger arrangement 100 of FIG. 6 to the heat exchanger arrangement 100 of FIG. 2 is that the intake manifold 33 and the outlet manifold 34 of the first heat absorbing section 10 are disposed in the plane of extension 13.

FIG. 7 shows a top view of outlet manifold 34 of the first heat absorbing section 10 and outlet header 36 of second heat releasing section of the configuration of FIG. 6. The arrangement of outlet manifold 34 in the plane of extension 13 requires that the fluid guiding means 15 of the second plurality extend through the outlet manifold 34 of the first heat absorbing section 10. The fluid guiding means 14 of the first plurality are fluidically connected to the outlet manifold 34 so that a refrigerant of the first heat absorbing section 10 is collected in outlet manifold 34 and flows through passages 57 between the wall 58 of the outlet manifold 34 and the fluid guiding means 15 of the second plurality.

FIG. 8 shows a cross sectional view of the thermally coupled first heat absorbing section 10 and the second heat releasing section 11 of the heat exchanger arrangement 100 of FIGS. 1, and 3 to 6. The cross sectional view corresponds to the plane of extension 13. In FIG. 8 two heat exchange structures 12 are shown. Each heat exchange structure 12 comprises a fluid guiding means 14 of the first plurality and a fluid guiding means 15 of the second plurality. The fluid guiding means 14, 15 are thermally connected by a material connection 20. Between the adjacent heat exchange structures 12 a clearance 16 is disposed. Cooling elements 17 configured as pleated cooling fins 18 are arranged in the clearance 16 and interconnect the adjacent heat exchange structures 12. Each fluid guiding means 14, 15 of the first plurality and of the second plurality comprises fluid channels 59, indicated with dashed lines, which are configured as microchannels 60. Heat from a coolant or refrigerant flowing through microchannel 60 of the fluid guiding means 15 of the second plurality of is transferred via the material connection 20 to a refrigerant or coolant flowing through microchannels 60 of the fluid guiding means 14 of the first plurality. In addition, heat is dissipated via airflow through the clearance 16. In the configuration of FIG. 8 heat is also dissipated to the airflow through clearance 16 from a first fluid guiding means 14 of the first plurality and from a fluid guiding means 15 of the second plurality.

In applications where it is undesirable to have heat dissipating to the airflow in clearance 16 from any fluid guiding means 14 of the first plurality the configuration of the heat exchange structures 12 according to FIG. 9 may be expedient. In this configuration each heat exchange structure 12 comprises one fluid guiding means 14 of the first plurality and two fluid guiding means 15 of the second plurality. The respective fluid guiding means 14 of the first plurality is disposed between and in thermal contact via material connections 20 with the respective adjacent fluid guiding means 15 of the second plurality.

FIG. 10 shows a cross section of the heat exchange structure 12 of FIG. 8 at a right angle to the plane of extension 13. The heat exchange structure 12 comprises a fluid guiding means 14 of the first plurality of fluid guiding means and a fluid guiding means 15 of the second plurality of fluid guiding means. Each of the fluid guiding means 14, 15 comprises a core 61 of a first metal 62 and a surface layer 63 of a second metal 64. The second metal 64 has a lower melting point than the first metal 62. For establishing the thermal coupling of the fluid guiding means 14 of the first plurality and the fluid guiding means 15 of the second plurality the heat exchange structure 12 is heated to a temperature between the melting temperatures of the second metal 64 and the first metal 62 so that only the second metal 64 is partially melted. When the melted surface layers 63 of the first fluid guiding means 14 and the second fluid guiding means 15 cool off and solidify they form the material connection 20 between the fluid guiding means 14 of the first plurality and the fluid guiding means 15 of the second plurality.

Since the cores 61 of the fluid guiding means 15 and the fluid guiding means 14 are unaffected by the melting process core regions 65 of the first fluid guiding means 14 and the second fluid guiding means 15 facing each other provide a double separating wall between the microchannels 60 of the first fluid guiding means 14 and the second fluid guiding means 15.

FIGS. 11 and 12 show a sixth configuration of heat exchanger arrangement 100 in a side view (FIG. 11) and in a perspective view (FIG. 12). The heat exchanger arrangement 100 of FIGS. 11 and 12 comprises a first heat absorbing section 10, a second heat releasing section 11 and a third heat absorbing section 21. The first heat absorbing section 10 comprises a first plurality 14 of fluid guiding means. The fluid guiding means 14 of the first plurality are interconnected with each other in a serpentine configuration via bent sections 66. The first heat absorbing section 10 is brazed to intake manifold 67 and outlet manifold 68. Fluid guiding means 15 of the second plurality, of which only one is shown in FIG. 12, of the second heat releasing section 11 and fluid guiding means 22 of a third plurality of the third heat absorbing section 21 are connected to each other to form combined fluid guiding means 29. The combined fluid guiding means 29 are also connected to each other in a serpentine configuration. Pleated cooling fins 18 are disposed between the fluid guiding means 22 of the third plurality. The heat exchanger arrangement 100 of the first heat absorbing section 10 and the second heat releasing section 11 comprises heat exchange structures 12 (FIG. 11). Each heat exchange structure 12 comprises a fluid guiding means 14 of the first plurality and a fluid guiding means 15 of the second plurality. Furthermore, each heat exchange structure 12 comprises a heat sink 69 providing a thermal connection between a respective fluid guiding means 14 of the first plurality and a respective fluid guiding means 15 of the second plurality. The heat exchange structures 12 are arranged in parallel to each other in a plane of extension 13 so that the heat sink 69 of each heat exchange structure 12 is in thermal contact with fluid guiding means 14 and 15 of the adjacent heat exchange structure 12.

In the configuration shown in FIGS. 11 and 12 no clearance is provided between adjacent heat exchange structures 12 so that air cannot flow between the heat exchange structures 12. The heat sinks 69 are configured as solid blocks 70 of aluminum. As shown particular in FIG. 12, the fluid guiding means 14 of the first plurality are arranged in the imagined plane of extension 13, while the fluid guiding means 15 of the second plurality are arranged in an imagined second plane 71 parallel to the plane of extension 13. The heat sinks 69 are in thermal contact with both the fluid guiding means 14 of the first plurality and the fluid guiding means 15 of the second plurality of each heat exchange structure 12 and furthermore are disposed in the plane of extension 13 and in the second plane 71.

A heat sink 69 configured as a solid block 70 of aluminum for the heat exchanger arrangement 100 of FIGS. 11 and 12 is shown in FIG. 13.

FIG. 14 shows a heat sink module 72. The heat sink module 72 comprises individual heat sinks 69 configured as blocks 70 of aluminum, which are connected on one side 73 to each other. With this configuration the connected heat sinks 69 exhibit a comb-like structure which allows for an easy manufacturing process of the first heat absorbing section 10 and second heat releasing section 11.

FIGS. 15 and 16 show a seventh configuration of a heat exchanger arrangement 100. The heat exchanger arrangement 100 comprises a first heat absorbing section 10 with fluid guiding means 14 of a first plurality, a second heat releasing section 11 with fluid guiding means 15 of a second plurality and a third heat absorbing section 21 with fluid guiding means 22 of a third plurality. The second heat releasing section 11 and the third heat absorbing section 21 form a pulsating heat pipe 74. In each case a fluid guiding means 22 of the third plurality and a fluid guiding means 15 of the second plurality are directly connected to each other and form a combined fluid guiding means 29. The fluid guiding means 14 of the first plurality are interconnected in a serpentine fashion via bent sections 66. The fluid guiding means 14 of the first plurality are oriented at a right angle to the fluid guiding means 15 of the second plurality and in combination with the bent sections 66 are configured winding between the fluid guiding means 15 of the second plurality, as is shown in the top view of FIG. 16. In each case a fluid guiding means 14 of the first plurality and a three fluid guiding means 15 of the second plurality form a heat exchange structure 12. It is also possible that in each case a fluid guiding means 14 of the first plurality and a two, four or more fluid guiding means 15 of the second plurality form a heat exchange structure 12. The fluid guiding means 15 of the second plurality of the second heat releasing section 11 are fluidically connected to a first manifold 75. In addition, the fluid guiding means 22 of the third plurality of the third heat absorbing section 21 are fluidically connected to a second manifold 76. In the pulsating heat pipe 74 a refrigerant flows back and forth between the second heat releasing section 11 and the third heat absorbing section 21. The pulsating heat pipe 74 refrigerant flow path is blocked at various points within first manifold 75 by condensing region manifold baffles 77 and within the second manifold 76 the pulsating heat pipe 74 refrigerant flow is blocked at various points by evaporating region manifold baffles 78.

FIG. 17 shows a schematic drawing of a pulsating heat pipe 74 comprising a second heat releasing section 11 and a third heat absorbing section 21. The flow path of a refrigerant in the pulsating heat pipe 74 is provided with a preferential direction indicated with the arrows by a check valve 79.

The invention claimed is:

1. Heat exchanger arrangement comprising a first heat absorbing section and a heat releasing section,
wherein a plurality of heat exchange structures are arranged in parallel to each other, in a plane of extension,
wherein the first heat absorbing section comprises a first plurality of fluid guiding mechanisms and wherein the heat releasing section comprises a second plurality of fluid guiding mechanisms,
wherein each heat exchange structure comprises at least one fluid guiding mechanism of the first plurality and at least one fluid guiding mechanism of the second plurality thermally coupled to each other, and arranged in parallel to each other, wherein a clearance is disposed between at least two adjacent heat exchange structures to allow airflow between said adjacent heat exchange structures and/or wherein each heat exchange structure comprises a heat sink to thermally couple the at least one fluid guiding mechanism of the first plurality and the at least one fluid guiding mechanism of the second plurality, further comprising a second heat absorbing section, wherein the heat releasing section and the second heat absorbing section form a first cooling circuit, wherein the first cooling circuit is a heat pipe, a thermosiphon, or a pulsating heat pipe, wherein the first heat absorbing section is an evaporator for a second cooling circuit configured as a vapor compression cycle circuit, wherein the second heat absorbing section comprises a third plurality of fluid guiding mechanisms, wherein each fluid guiding mechanism of the second plurality is directly connected to a fluid guiding mechanism of the third plurality in the primary direction of extension of the fluid guiding mechanism to form a combined fluid guiding mechanism extending linearly along the primary direction of extension.

2. Heat exchanger arrangement according to claim 1, wherein the fluid guiding mechanism of the first plurality are fluidically interconnected in a serpentine configuration and/or wherein the combined fluid guiding mechanism is fluidically interconnected in a serpentine configuration, and/or wherein the heat releasing section is a condenser, and/or wherein the thermal coupling between the fluid guiding mechanism of the first plurality and the fluid guiding mechanism of the second plurality extends over a part or over a full length of the heat releasing section.

3. Heat exchanger arrangement according to claim 1, wherein the fluid guiding mechanism of the first plurality and/or the fluid guiding mechanism of the second plurality and/or the fluid guiding mechanism of the third plurality are configured plate-like or strip-like, and/or wherein the fluid guiding mechanism of the first plurality and/or the fluid guiding mechanism of the second plurality and/or the fluid guiding mechanism of the third plurality comprise at least one internal fluid channel, wherein the at least one fluid channel is a microchannel.

4. Heat exchanger arrangement according to claim 1, wherein the first heat absorbing section comprises a refrigerant or coolant with a Global Warming Potential (GWP) of less than 1000, and/or wherein the first cooling circuit comprises an incombustible or unharmful refrigerant or coolant, and/or wherein the first heat absorbing section comprises a combustible or harmful refrigerant, in particular propane.

5. Heat exchanger arrangement according to claim 1, comprising an airflow regulation flap arranged on the first heat absorbing section and/or the heat releasing section, which in an open position allows airflow through the heat exchanger arrangement, in particular through the clearance, and which in a closed position at least partially prevents airflow through the heat exchanger arrangement, in particular through the clearance, and/or wherein cooling elements are arranged in the clearance between two adjacent heat exchange structures interconnecting the adjacent heat exchange structures, wherein the cooling elements are cooling fins.

6. Heat exchanger arrangement according to claim 5, wherein the fluid guiding mechanism of the first plurality and the fluid guiding mechanism of the second plurality and the cooling elements, in particular the cooling fins, are arranged in the plane of extension, and/or wherein each exchange structure of the plurality of heat exchange structures comprises exactly one fluid guiding mechanism of the first plurality and exactly one fluid guiding mechanism of the second plurality, or wherein in the heat exchange structure one fluid guiding mechanism of the first plurality is arranged between and thermally coupled to two fluid guiding mechanisms of the second plurality.

7. Heat exchanger arrangement according to claim 1, wherein the first heat absorbing section comprises an intake manifold and an outlet manifold, wherein the first plurality of fluid guiding mechanisms are fluidically connected to the intake manifold and to the outlet manifold, at opposing ends of the fluid guiding mechanisms.

8. Heat exchanger arrangement according to claim 1, wherein the fluid guiding mechanism of the second plurality or the combined fluid guiding mechanism are fluidically connected to an intake header and/or to an outlet header, and wherein the intake header and/or the outlet header are arranged in the plane of extension, and/or wherein the fluid guiding mechanisms of the heat exchange structures are thermally coupled by a material connection, and/or wherein the fluid guiding mechanism of the first plurality and the fluid guiding mechanism of the second plurality comprise a core of a first material, in particular of a first metal or alloy, and a surface layer of a second material, in particular of a second metal or alloy, wherein the second material of the surface layer has a lower melting temperature than the first material of the core.

9. Heat exchanger arrangement according to claim 1, wherein the fluid guiding mechanism of the first plurality is disposed in the plane of extension and wherein the fluid guiding mechanism of the second plurality is disposed in a second plane parallel to the plane of extension, wherein each heat exchange structure comprises a heat sink to thermally couple the at least one fluid guiding mechanism of the first plurality and the at least one fluid guiding mechanism of the second plurality and wherein the heat sink of each heat exchange structure is disposed at a right angle to the plane of extension and at least partially arranged in the plane of extension and the second plane.

10. Heat exchanger arrangement according to claim 9, wherein the heat sink of each heat exchange structure is configured as a block, in particular a solid block, of a metal or an alloy, and/or wherein the heat sink of each of the heat exchange structures is in thermal contact with at least one of the respective fluid guiding mechanisms of the adjacent heat exchange structure.

11. Heat exchanger arrangement according to claim 9, wherein the heat sinks of the heat exchange structures are connected to each other on one side.

12. Heat exchanger arrangement according to claim 4, wherein the first heat absorbing section comprises a refrigerant or coolant with a Global Warming Potential (GWP) of less than 100.

13. Heat exchanger arrangement according to claim 4, wherein the first heat absorbing section comprises a refrigerant or coolant with a Global Warming Potential (GWP) of less than 10.

14. Heat exchanger arrangement according to claim 4, wherein the first heat absorbing section comprises a refrigerant or coolant with a Global Warming Potential (GWP) of less than 3.

15. Heat exchanger arrangement according to claim 5, wherein the cooling fins are pleated.

16. Heat exchanger arrangement according to claim 7, wherein the outlet manifold and the intake manifold of the first heat absorbing section are arranged on opposing sides of the second heat releasing section and/or of the plane of extension.

17. Heat exchanger arrangement according to claim 7, wherein the outlet manifold and the intake manifold of the first heat absorbing section are arranged on the same side of the second heat releasing section and/or of the plane of extension.

18. Heat exchanger arrangement according to claim 7, wherein the outlet manifold and/or the intake manifold are arranged in the plane of extension, and wherein the fluid guiding mechanism of the second plurality extend through the intake manifold and/or the outlet manifold.

19. Method for producing a heat exchanger arrangement comprising a first heat absorbing section and a heat releasing section,
wherein a plurality of heat exchange structures are arranged in parallel to each other, in a plane of extension,
wherein the first heat absorbing section comprises a first plurality of fluid guiding mechanisms and wherein the heat releasing section comprises a second plurality of fluid guiding mechanisms,
wherein each heat exchange structure comprises at least one fluid guiding mechanism of the first plurality and at least one fluid guiding mechanism of the second plurality thermally coupled to each other, and arranged in parallel to each other,
wherein a clearance is disposed between at least two adjacent heat exchange structures to allow airflow between said adjacent heat exchange structures and/or wherein each heat exchange structure comprises a heat sink to thermally couple the at least one fluid guiding mechanism of the first plurality and the at least one fluid guiding mechanism of the second plurality,
further comprising a second heat absorbing section,
wherein the heat releasing section and the second heat absorbing section form a first cooling circuit,
wherein the first cooling circuit is a heat pipe, a thermosiphon, or a pulsating heat pipe,
wherein the first heat absorbing section is an evaporator for a second cooling circuit configured as a vapor compression cycle circuit,
wherein the second heat absorbing section comprises a third plurality of fluid guiding mechanisms,
wherein each fluid guiding mechanism of the second plurality is directly connected to a fluid guiding mechanism of the third plurality in the primary direction of extension of the fluid guiding mechanism to form a combined fluid guiding mechanism extending linearly along the primary direction of extension,
wherein the method comprises the steps of thermally connecting a fluid guiding mechanism of a first plurality of fluid guiding mechanism and a fluid guiding mechanism of a second plurality of fluid guiding mechanism to form a heat exchange structure,
arranging a plurality of heat exchange structures in a plane of extension and interconnecting adjacent heat exchange structures with, in particular pleated, cooling fins,
attaching an intake manifold and an outlet manifold to opposite ends of the fluid guiding mechanism of the first plurality.

20. Method according to claim 19, wherein the fluid guiding mechanism of the first plurality and the fluid guiding mechanism of the second plurality comprise a core of a first material, in particular of a first metal or alloy, and a surface layer of a second material, in particular of a second metal or alloy, the method further comprising the step of thermally coupling in each case a fluid guiding mechanism of the first plurality and a fluid guiding mechanism of the second plurality with a material connection by partially melting the surface layers of the fluid guiding mechanism.

* * * * *